United States Patent [19]

Kimura et al.

[11] Patent Number: 5,634,377

[45] Date of Patent: Jun. 3, 1997

[54] ARTICULATED ROBOT

[75] Inventors: Akira Kimura, Tokyo; Morio Tominaga, Kanagawa, both of Japan

[73] Assignee: Sony Corporation, Japan

[21] Appl. No.: 396,719

[22] Filed: Mar. 1, 1995

[30] Foreign Application Priority Data

Mar. 9, 1994 [JP] Japan .................. 6-064339
Mar. 14, 1994 [JP] Japan .................. 6-068192

[51] Int. Cl.⁶ .................................................. G05G 13/00
[52] U.S. Cl. .................. 74/490.04; 74/490.03; 91/15; 91/48
[58] Field of Search .................. 901/48, 15; 74/490.01, 74/490.02, 490.03, 490.04, 490.05

[56] References Cited

U.S. PATENT DOCUMENTS

| 4,557,662 | 12/1985 | Terauchi et al. | |
| 4,991,456 | 2/1991 | Shibata et al. | 74/490.03 |
| 5,031,474 | 7/1991 | Keppler et al. | 74/490.04 |
| 5,054,332 | 10/1991 | Terauchi et al. | 74/490.04 |
| 5,271,292 | 12/1993 | Sawada et al. | |
| 5,357,824 | 10/1994 | Hashimoto | 74/490.03 |
| 5,415,057 | 5/1995 | Nihei et al. | 74/490.01 |

FOREIGN PATENT DOCUMENTS

| 0174619 | 3/1986 | European Pat. Off. . |
| 0236109 | 9/1987 | European Pat. Off. . |
| 2450673 | 10/1980 | France . |
| 2560805 | 9/1985 | France . |
| 3618223 | 12/1986 | Germany . |

*Primary Examiner*—Andrea L. Pitts
*Assistant Examiner*—David M. Fenstermacher
*Attorney, Agent, or Firm*—Ronald P. Kananen

[57] ABSTRACT

A robot has a base shaft portion disposed on a base, a first arm attached in a rotatable state to the base shaft portion, and a second arm attached in a rotatable state to the first arm. Balance setting is performed so as to position the center of gravity of the second arm above the rotation shaft of the second arm. A housing to which the motor, whose driving power is transmitted to a rotation shaft of the second arm by a steel belt, and harmonic reduction gear for rotating the second arm are fixed, is supported in a rotatable state with respect to the first arm, the drive shaft of the motor being disposed substantially coaxial with a rotation shaft of the first arm. A support arm of the housing is supported in a rotatable and slidable state along the length direction of the first arm by a support member fixed to the base shaft portion. In adjusting the tension of the steel belt the housing is displaced by a setting bolt to change the gap between the rotation shaft of the second arm and the output shaft of the harmonic reduction gear.

9 Claims, 16 Drawing Sheets

FIG. 7A
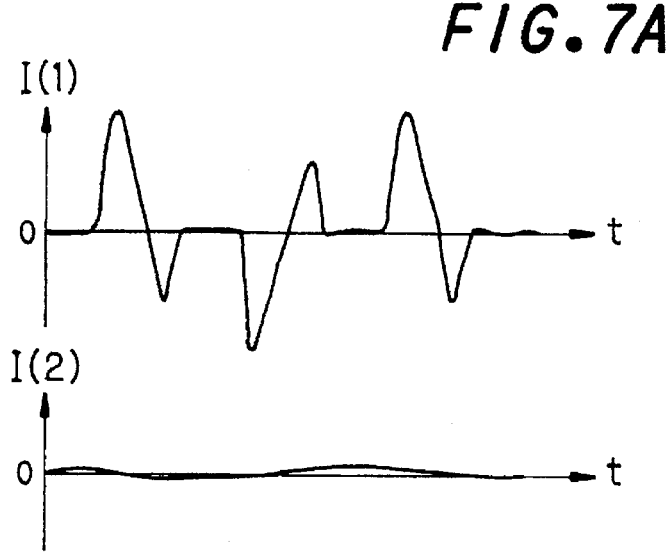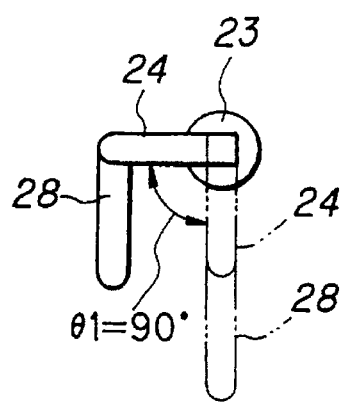
FIG. 7B
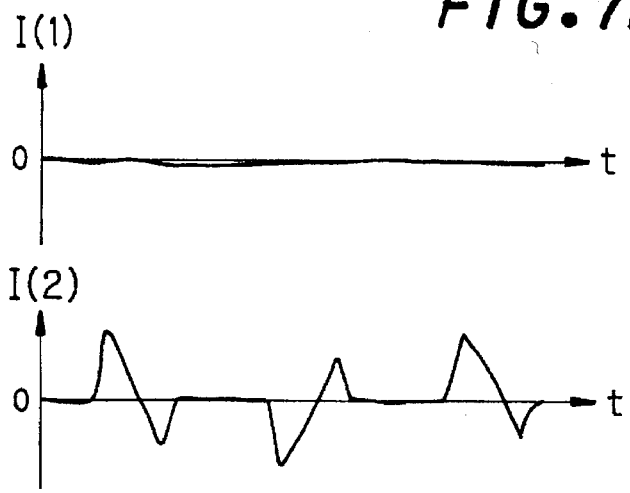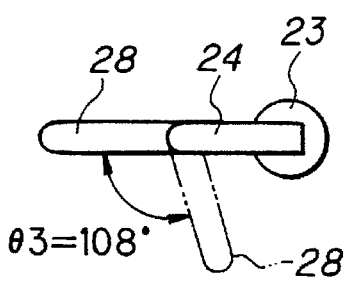
FIG. 7C
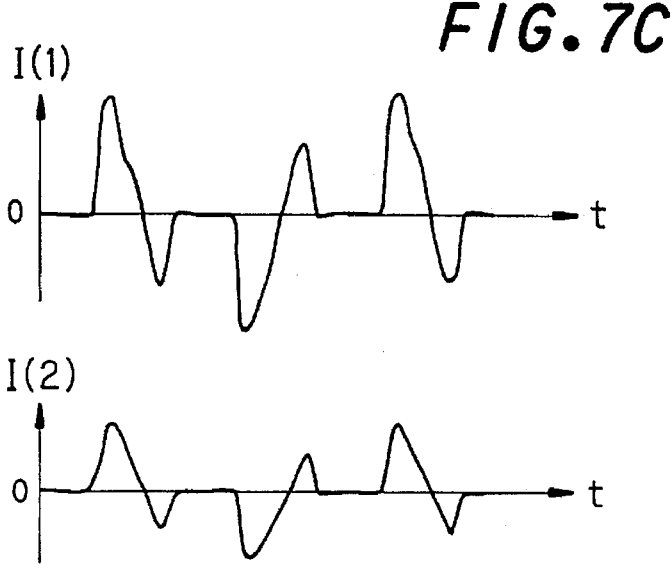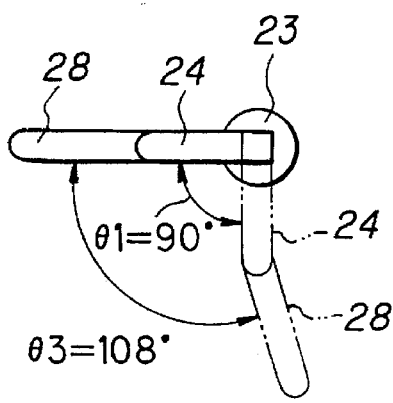

ARTICULATED ROBOT

BACKGROUND OF THE INVENTION

1. Field of the Invention

The present invention aims to provide a novel articulated robot with the object of eliminating or reducing mechanical interference between arms or between arms and tools in the articulated robot.

2. Description of the Prior Art

Articulated robots are constructed from a plurality of arms, in which operation control is performed while interference extends between arms or between arms and tools.

FIGS. 8 and 17 show a model of a conventional horizontal articulated robot structure. Robot a is formed from a base shaft portion b, a first arm c and a second arm d, one end portion of the first arm c being attached to the base shaft b in a rotatable state. Also, one end of the second arm d is attached to the other end portion of the first arm c in a rotatable state, a tool mounting shaft e being provided at the other end of the second arm d.

A motor f and a harmonic reduction gear g are provided for rotating the first arm c on the base shaft portion b, the driving power of the motor f being transmitted as the rotating power of the first arm c via the harmonic reduction gear g.

A mechanism for rotating the second arm d is provided in the first arm c. For example, as shown in the drawing, a motor i and harmonic reduction gear j are attached to a support portion h fixed to the first arm c, and s pulley k is attached to an output shaft of the harmonic reduction gear j, l is a pulley forming a pair with the pulley k, and is fixed to the rotation shaft of the second arm d. Also, a belt m is extended between the pulley k and the pulley l. The driving power of the motor i becomes the rotating power for the pulley k via the harmonic reduction gear j, and this is transmitted to the pulley l by the belt m to become the rotating power of the second arm d.

FIG. 18 graphically expresses the structure when the robot a is viewed horizontally, the two-dimensional positional coordinates (X and Y) with a point of origin 0 as the rotational center of the first arm c being set to the base shaft portion b.

In FIG. 18 the point C indicates the rotational center of the second arm d, point E indicates a terminal position, the first arm c is indicated by the line OC (length "L1"), and the line CE (length "L2") indicates the second arm d. Also, the angle "θ1" indicates an angle formed by the line OC with respect to the X axis, and the angle "θ2" indicates an angle formed by the line CE with respect to an elongated line of line OC.

The point P1 and the point P2 respectively indicate the position of the center of gravity of the first arm c and the position of the center of gravity of the second arm d, the length of the line OP1 is made "l1" and the length of the line CP2 is made "l2".

In leading through an equation of motion with respect to a power system model simplified in this manner, position, speed etc. can be expressed by means of a complex indicator by using a complex planar coordinate system taking the X axis as a real axis and the Y axis as an imaginary axis.

For example, the position of the center of gravity of each arm and the time differential of a first stage thereof are expanded to a complex amount and expresses as in the following equation.

[Equation 1]
$$P1 = l1 \cdot \exp(i \cdot \theta 1)$$
$$P2 = L1 \cdot \exp(i \cdot \theta 1) + l2 \cdot \exp(i \cdot (\theta 1 + \theta 2))$$
$$\frac{dP1}{dt} = l1 \cdot i \cdot \frac{d\theta 1}{dt} \cdot \exp(i \cdot \theta 1)$$
$$\frac{dP2}{dt} = L1 \cdot i \cdot \frac{d\theta 1}{dt} \cdot \exp(i \cdot \theta 1) +$$
$$l2 \cdot i \cdot \left( \frac{d\theta 1}{dt} + \frac{d\theta 2}{dt} \right) \cdot \exp(i \cdot (\theta 1 + \theta 2))$$

Note that here "i" is an imaginary unit.

Since the angle of rotation of the motor f is $R1.\theta 1$ when the angle of rotation of the first arm c is $\theta 1$ and the angle of rotation of the motor i is $R2.\theta 2$ when the angle of rotation of the second arm is $\theta 2$, where the total movement energy of the robot system is "Ek", we have the following equation.

[Equation 2]
$$Ek = \frac{1}{2} \cdot M1 \cdot \left| \frac{dP1}{dt} \right|^2 + \frac{1}{2} \cdot M2 \cdot \left| \frac{dP2}{dt} \right|^2 +$$
$$\frac{1}{2} \cdot I_{1G} \cdot \left| \frac{d\theta 1}{dt} \right|^2 + \frac{1}{2} \cdot I_{2G} \cdot \left| \frac{d\theta 1}{dt} + \frac{d\theta 2}{dt} \right|^2 +$$
$$\frac{1}{2} \cdot I_{m1} \cdot \left| R1 \cdot \frac{d\theta 1}{dt} \right|^2 + \frac{1}{2} \cdot I_{m2} \cdot \left| R2 \cdot \frac{d\theta 2}{dt} \right|^2$$

Since the square value of speed is obtained as the absolute value of a complex number, Ek is as follows.

[Equation 3]
$$Ek = \frac{1}{2} \cdot (a + 2 \cdot b \cdot \cos\theta 2) \cdot \left( \frac{d\theta 1}{dt} \right)^2 +$$
$$\frac{1}{2} \cdot c \cdot \left( \frac{d\theta 2}{dt} \right)^2 + (c + b \cdot \cos\theta 2) \cdot \frac{d\theta 1}{dt} \cdot \frac{d\theta 2}{dt}$$

However,
$$a = M1 \cdot l1^2 + M2 \cdot L1^2 + M2 \cdot l2^2 +$$
$$I_{1G} + I_{2G} + I_{m1} \cdot R1^2$$
$$= I1 + I2 + M2 \cdot L1^2 + I_{m1} \cdot R1^2$$
$$b = M2 \cdot L1 \cdot l2$$
$$c = M2 \cdot l2^2 + I_{2G} + I_{m2} \cdot R2^2 = I2 + I_{m2} \cdot R2^2$$

Since the potential energy is 0, upon applying [Equation 3] to the equation of motion ([Equation 4]) of each arm according to a Euler-Lagrange equation while taking care that the Langrangian is equal to Ek, the output torque of the harmonic reduction gear can be obtained as in [Equation 5].

[Equation 4]
$$\frac{d}{dt} \left( \frac{\delta Ek}{\delta \pi i} \right) - \frac{\delta Ek}{\delta \theta i} = Ti \quad (i = 1, 2)$$

However,
$$\pi i = \frac{d\theta i}{dt}$$

[Equation 5]
$$T1 = (a + 2 \cdot b \cdot \cos\theta 2) \cdot \frac{d^2\theta 1}{dt^2} +$$
$$(c + b \cdot \cos\theta 2) \cdot \frac{d^2\theta 2}{dt^2} -$$
$$2 \cdot b \cdot \sin\theta 2 \cdot \frac{d\theta 1}{dt} \cdot \frac{d\theta 2}{dt} - b \cdot \sin\theta 2 \cdot \left( \frac{d\theta 2}{dt} \right)^2$$

-continued
$$T2 = c \cdot \frac{d^2\theta2}{dt^2} + (c + b \cdot \cos\theta2) \cdot \frac{d^2\theta1}{dt^2} +$$
$$b \cdot \sin\theta2 \cdot \left(\frac{d\theta1}{dt}\right)^2$$

Note that in the above equations the effect of the viscosity term of friction etc. is ignored. In [Equation 5], the first term on the right side of the first equation of T1 shows an inertia term and the second term the inertia force (torque) received from the second arm d, and also, the third term shows Coriolis force (torque) and the fourth term shows torque where centrifugal force extends to the first arm c due to the rotation of the second arm d.

Also, the first term on the right side of the second equation of T2 shows an inertia term and the second term the inertia force (torque) received from the first arm c, and also, the third term shows torque where centrifugal force extends to the second arm d due to the rotation of the first arm c.

With respect to the movement of each arm an interference term as well as an inertia term exists in the arms themselves, but since the absolute value of this interference term is substantially the same amount as the inertia term, it can be ignored.

SUMMARY OF THE INVENTION

In the conventional articulated robot as described above, since the first arm and second arm move while mutually imposing mechanical interference on each other, when performing positioning with regard to the terminal position of the robot it is difficult to shorten the time needed for static determination, and there is the problem that as a result the tact time lengthens.

This is because the following items (1) through (3) are the main causes.

(1) The inertia term (the first term on the right side of the first equation of [Equation 5]) relating the movement of the first arm affects the position of the second arm (note the term 2.b.cosθ2 in the inertia term).

(2) The first arm receives the effects of the inertia force, Coriolis force and centrifugal force (the second through fourth terms on the right side of the first equation of [Equation 5]) generated by the movement of the second arm.

(3) The second arm receives the effects of the inertia force and centrifugal force (second and third terms on the right side of the second equation of [Equation 5]) generated by the movement of the first arm.

Due to the complex interference operation between the first arm and the second arm, optimal gain in the feedback control of the positions and speeds thereof changes according to the orientation of the robot and control becomes difficult.

The articulated robot of the present invention, in order to solve the above problems, in an articulated robot provided with a base shaft portion disposed on a base, a first rotating body attached to the base shaft portion in a rotatable state and a second rotating body attached to the first rotating body in a rotatable state, has the following structures (a) and (b).

(a) As well as a drive means for rotating the second rotating body being fixed to the base or the base shaft portion, a drive shaft of the drive means of the second rotating body and a drive shaft of drive means of the first rotating body are arranged to be substantially the same axis, and a driving power transmission means for transmitting driving power by the drive means of the second rotating body to a rotation shaft of the second rotating body is provided.

(b) The center of gravity of the second, rotating body is positioned substantially on the rotation shaft of the second arm.

BRIEF DESCRIPTION OF THE DRAWINGS

These and other features, aspects and advantages of the present invention will become better understood with reference to the following description, appended claims and accompanying drawings, wherein

FIG. 7(a) is a diagram showing motor currents together with arm movements with respect to an articulated robot according to the present invention in a case where only the first arm is moved;

FIG. 7(b) is a diagram showing motor currents together with arm movements with respect to an articulated robot according to the present invention in a case where only the second arm is moved;

FIG. 7(c) is a diagram showing motor currents together with arm movements with respect to an articulated robot according to the present invention in a case where the first arm and the second arm are moved;

DESCRIPTION OF THE PREFERRED EMBODIMENTS

Figure 1:
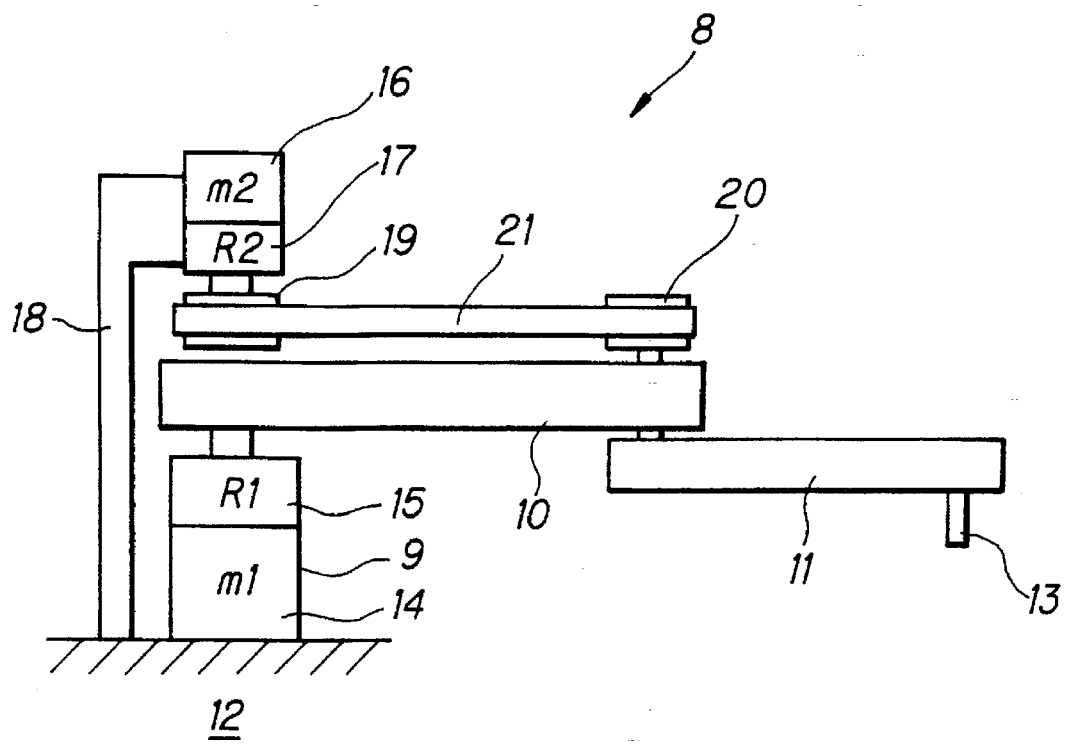
FIG. 1 is an outline view illustrating the structure of the articulated robot of the present invention.

Herebelow, the details of the articulated robot of the present invention will be explained according to the embodiments shown in the drawings.

The following two items are incorporated in the structure of the robot of the present invention.

(I) The center of gravity (P2) of the second arm is located on the rotation shaft of the second arm.

(II) A driving means, (motor, reduction gear etc.) for rotating the second arm is not attached to the first arm, but is supported by attaching a fixed support member to a base shaft portion or the base thereof.

Firstly, explaining (I), substituting b=0 in the above [Equation 5], the Coriolis force (third term on the right side of the first equation of [Equation 5]) and centrifugal force (second term on the right of the first equation and third term on the right side of the second equation of [Equation 5]) are deleted to obtain the following equation.

$$T1 = a \cdot \frac{d^2\theta1}{dt^2} + c \cdot \frac{d^2\theta2}{dt^2}$$

$$T1 = a \cdot \frac{d^2\theta2}{dt^2} + c \cdot \frac{d^2\theta1}{dt^2}$$

[Equation 6]

Since b=M2.L1.l2, and the mass M2 of the second arm and the length L1 of the first arm cannot be made 0, it is understood that it is preferable for l2 to be made to equal 0 in order for b to equal 0 and the center of gravity of the second arm to be located on the rotation shaft thereof.

As a result, since the right side of [Equation 6] becomes a linearly combined equation of the double differential of $\theta1$ and the double differential of $\theta2$, the effect of interference between the arms can be reduced.

In order to position the center of gravity of the second arm on the rotation shaft thereof, the following methods cad be used.

(a) Method of adding weight to the second arm

Figure 3A:
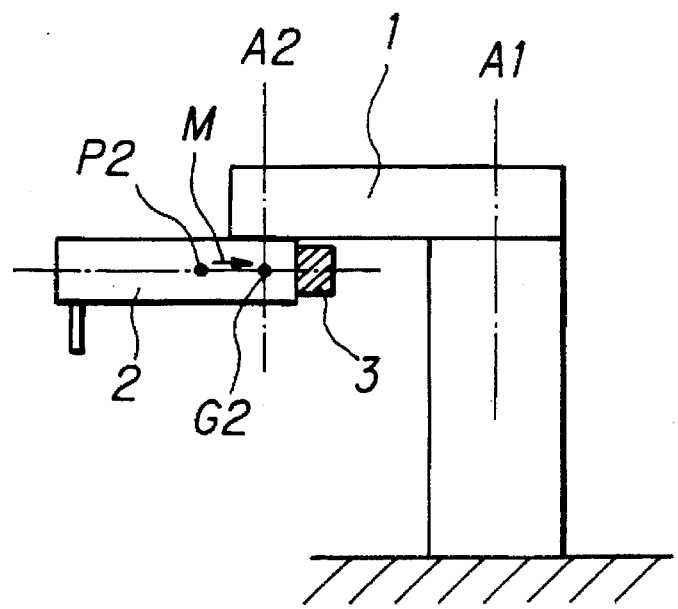
FIG. 3(a) is a view for explaining a method of balance adjustment of the second arm where a counterweight is added to the second arm.

In the horizontal articulated robot shown in outline in FIG. 3(a), A1 indicates the rotation shaft of the first arm and A2 indicates the rotation shaft of the second arm, a counterweight 3 is attached to the end portion opposite the terminal in the end portion of the second arm 2, the center of gravity P2 of the second arm is moved as shown by the arrow M before the counterweight 3 is attached to adjust balance such that the center of gravity P2 approaches the rotation shaft A2.

Figure 3B:
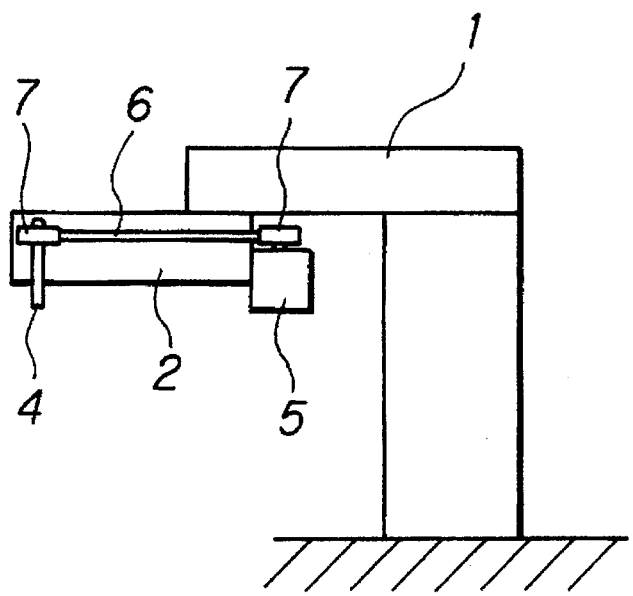
FIG. 3(b) is a view for explaining a method or balance adjustment of the second arm where the driving motor of a tool mounting shaft is employed as a counterweight.

(b) Method of using a drive portion member or the like of an end effector provided at the terminal position of the robot as a weight As shown in FIG. 3(b), a drive motor 5 of a tool mounting shaft 4 provided at the end portion of the terminal side of the second arm 2 is used as a counterweight and the balance thereof adjusted so that the center of gravity of the second arm 2 approaches the rotation shaft A2. In the drawing, an example using the drive motor 5, a belt 6 and a pair of pulleys 7 and 7 is shown as the rotating mechanism of the tool mounting shaft 4.

In the method of (a), besides having the advantage that the position of the center of gravity of the second arm 2 can be made freely adjustable by a adding a weight, the articulated system including the second arm 2 becomes heavy in its entirety, but in the method of (b) a member originally necessary as a drive source (drive motor 5) for an end effector can be used as a counterweight. However, in the method of (b) there is the limitation that the mass of the member for adjusting the center of gravity of the second arm 2 cannot be arbitrarily selected. Note that actually it is best to compensate for the disadvantages of both by combining the methods of (a) and (b).

Next, we move to the explanation of the item (II).

Figure 8:
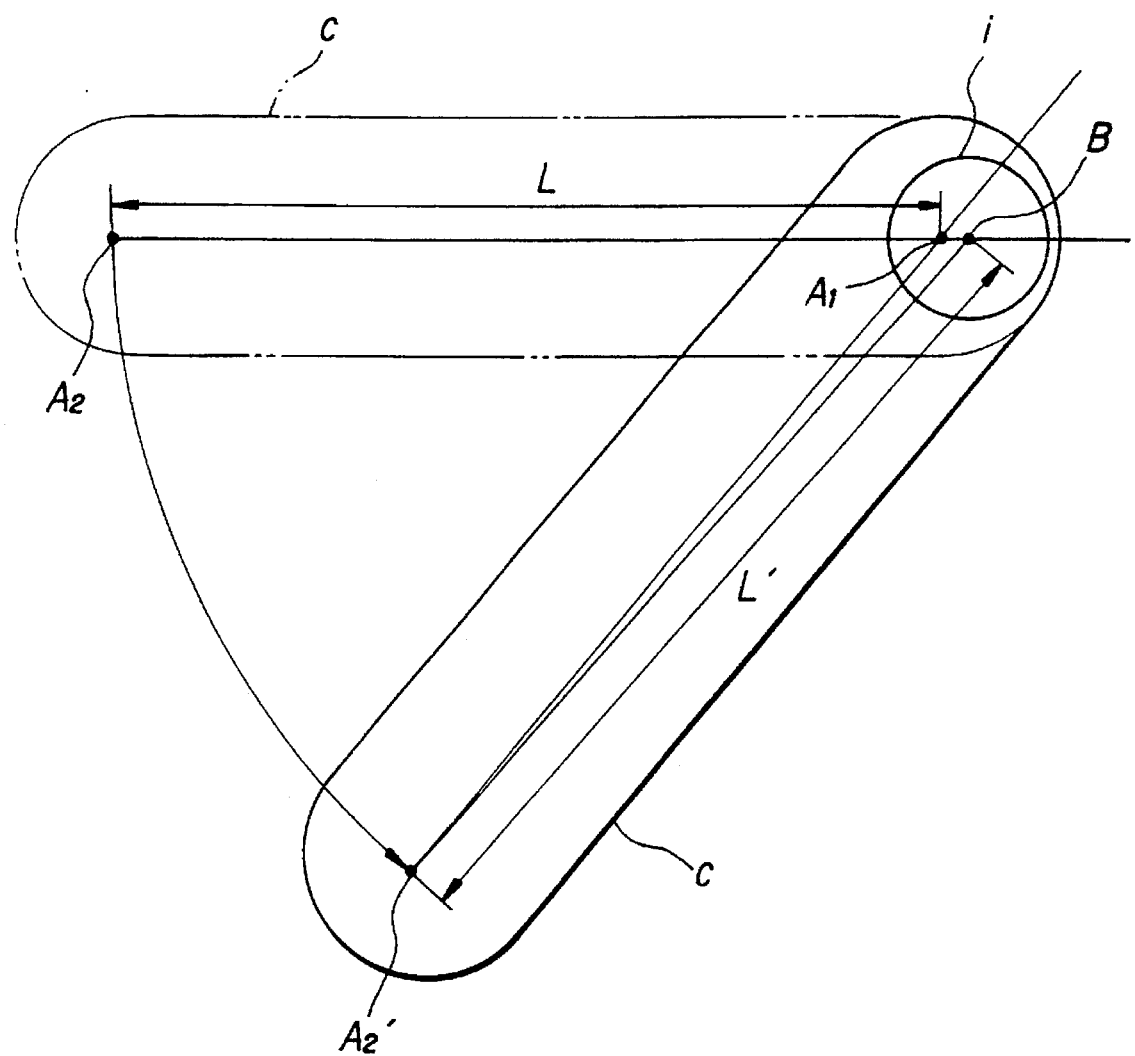
FIG. 8 is an horizontal outline view for explaining deficiencies in the case where a conventional tensioning method is applied to the robot of FIG. 1.

FIG. 1 shows a model of a structure of a horizontal articulated robot in order to explain support of the motor for rotating the second arm, the difference to the robot shown in FIG. 8 being the point that the motor and harmonic reduction gear for rotating the second arm are supported by a support member fixed to the base.

The robot 8 comprises a base shaft portion 9, a first arm 10 having a mass M1 and a second arm 11 having a mass M2, the base shaft portion 9 being fixed on a base 12. Also, one end of the first arm 10 is attached to the base shaft portion 9 in a rotatable state, one end portion of the second arm 11 is attached to the other end portion of the first arm 10 in a rotatable state, and a tool mounting shaft is provided at the other end portion of the second arm 11.

A motor 14 and harmonic reduction gear 15 are provided at the base shaft portion 9 for rotating the first arm 10, the driving power of the motor 14 being transmitted as the rotating power of the first arm 10 via the harmonic reduction gear 15.

Also, a motor 16 and harmonic reduction gear 17 are used for rotating the second arm 11 and these are attached to a support member 18 fixed to the base 12. A pulley 19 is attached to an output shaft of the harmonic reduction gear 17 and a pulley 20 which forms a pair with the pulley 19 is fixed to the rotation shaft of the second arm 11. Also, a belt 21 is extended between the pulley 19 and the pulley 20.

Consequently, the motor 16 and harmonic reduction gear 17 are kept in a continuously stationary state which is completely unrelated to the movement of the first arm 10, the driving power of the motor 16 being the rotating power of the pulley 19 via the harmonic reduction gear 17, this being transmitted to the pulley 20 by the belt 21 to becomes the rotating power of the second arm 11. Note that the drive shaft of the motor 16 and the drive shaft of the motor 14 are located on the same axis.

Figure 2:
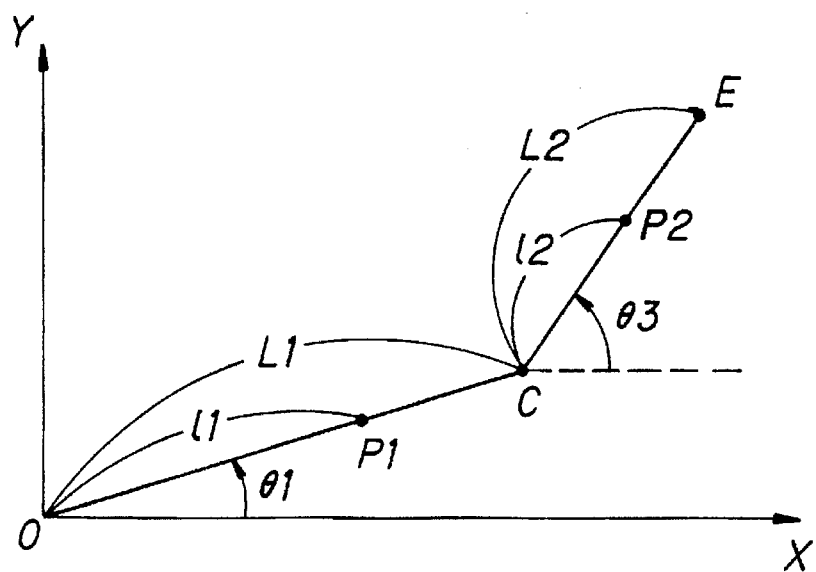
FIG. 2 is a chart graphically showing the robot of FIG. 1 in the horizontal plane.
Figure 9:
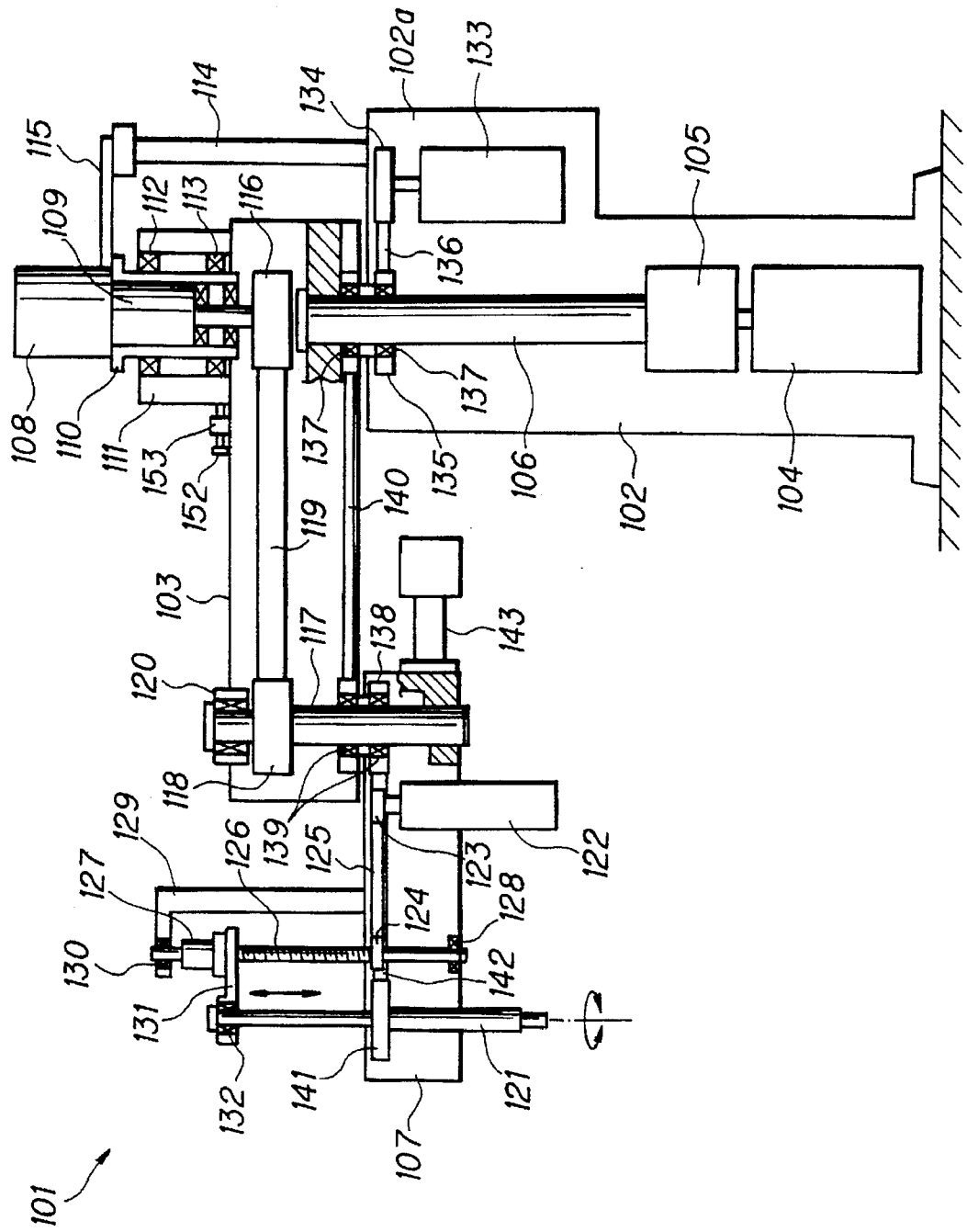
FIG. 9 is a transparent side view showing in outline another structural example of the articulated robot of the present invention.
Figure 10:
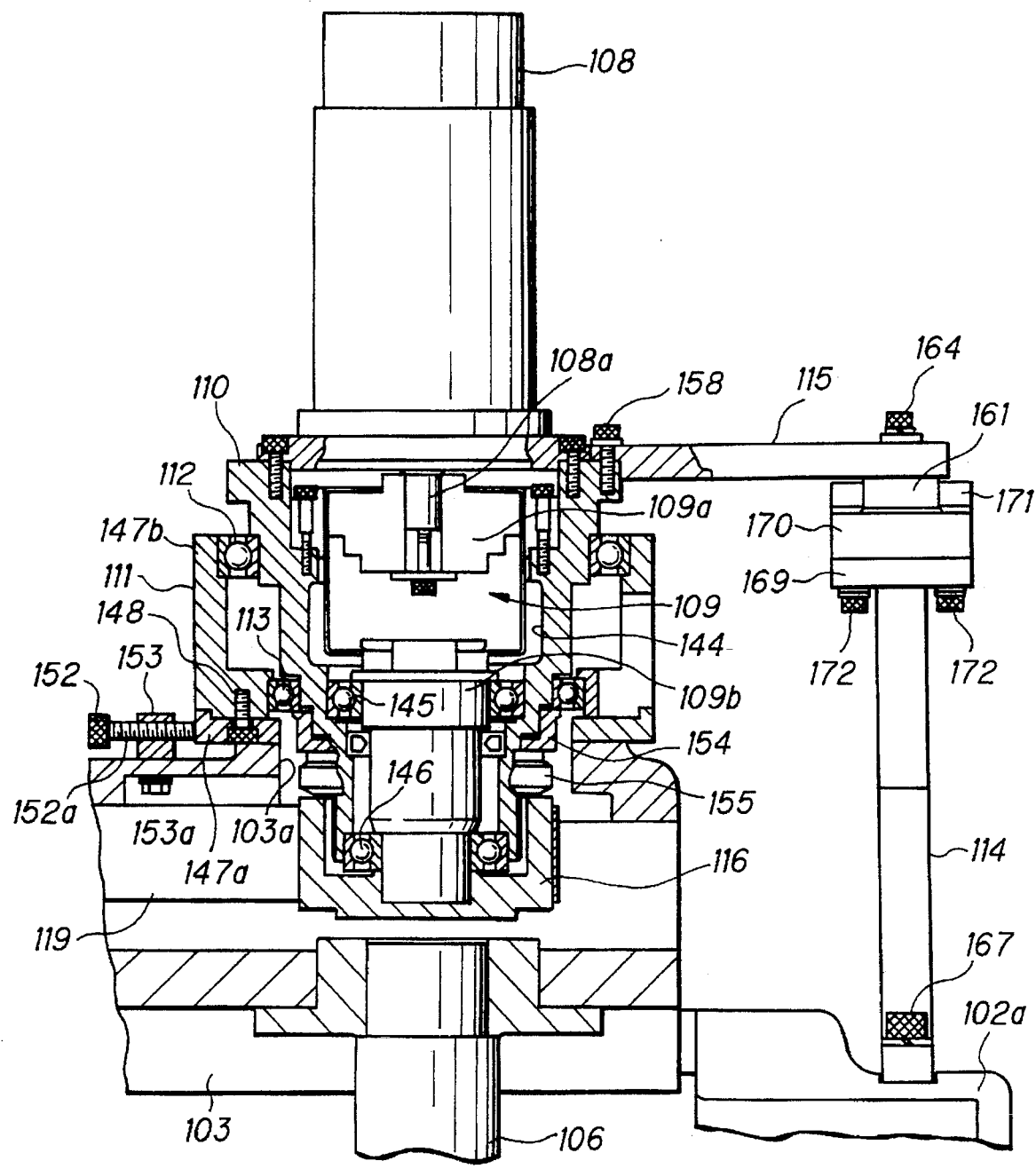
FIG. 10 is an enlarged side cutaway view of part of the main components of the articulated robot shown in FIG. 8.

FIG. 2 graphically expresses a structure when looking at the robot 8 in a horizontal plane, the two-dimensional positional coordinate system (X and Y) with the center of rotation of the first arm 10 as the point of origin O being set at the base shaft portion 9 similarly to FIG. 9.

In FIG. 2 the points C, E, P1 and P2, lengths L1, L2, l1 and l2, and the angle θ1 are as described above.

The angle "θ3" is an angle formed by the second arm 11 with respect to the X axis and, as is clear from the motor 16 which is the drive source of the second arm 11 being fixed to the support member 18, the angle of rotation of the motor 16 is the angle of rotation of the second arm 11 as is.

In leading through an equation of motion with respect to this power system model and expressing position, speed etc. by means of a complex indicator by using a complex planar coordinate system taking the X axis as a real axis end the Y axis as an imaginary axis, the centers of gravity of the arms and the first stage time differential thereof are expanded to a complex amount and expressed as in the following equation.

$$P1 = L1 \cdot \exp(i \cdot \theta 1)$$
$$P2 = L1 \cdot \exp(i \cdot \theta 1) + l2 \cdot \exp(i \cdot \theta 3)$$
$$\frac{dP1}{dt} = l1 \cdot i \cdot \frac{d\theta 1}{dt} \cdot \exp(i \cdot \theta 1)$$
$$\frac{dP2}{dt} = L1 \cdot i \cdot \frac{d\theta 1}{dt} \cdot \exp(i \cdot \theta 1) + l2 \cdot i \cdot \frac{d\theta 3}{dt} \cdot \exp(i \cdot \theta 3)$$
[Equation 7]

With respect to symbols of the physical amount necessary upon analysis, all of the symbols shown in the previously described tables 1 and 2 are employed except for T1 and T2, T1' and T2' being used in place of T1 and T2. In other words, "T1'" is the torque of the output shaft of the harmonic reduction gear 15 and "T2'" is the torque of the output shaft of the harmonic reduction gear 17.

Since the angle of rotation of the motor 14 is R1 Åθ1 when the angle of rotation of the first arm 10 is θ1 and the angle of rotation of the motor 16 is R2 Åθ2 when the angle of rotation of the second arm 11 is θ3, where the total movement energy of the robot system is "Ek'", we have the following equation.

$$Ek' = \frac{1}{2} \cdot M1 \cdot \left| \frac{dP1}{dt} \right|^2 + \frac{1}{2} \cdot M2 \cdot \left| \frac{dP2}{dt} \right|^2 +$$
$$\frac{1}{2} \cdot I_{1G} \cdot \left| \frac{d\theta 1}{dt} \right|^2 + \frac{1}{2} \cdot I_{2G} \cdot \left| \frac{d\theta 3}{dt} \right|^2 +$$
$$\frac{1}{2} \cdot I_{m1} \cdot \left| R1 \cdot \frac{d\theta 1}{dt} \right|^2 + \frac{1}{2} \cdot I_{m2} \cdot \left| R2 \cdot \frac{d\theta 3}{dt} \right|^2$$
[Equation 8]

The following [Equation 9] can be obtained from [Equation 7] and [Equation 8]. Note that at this time the square value of speed may be obtained as the absolute value of a complex number.

$$Ek' = \frac{1}{2} \cdot a' \cdot \left( \frac{d\theta 1}{dt} \right)^2 +$$
$$\frac{1}{2} \cdot c \cdot \left( \frac{d\theta 3}{dt} \right)^2 + b \cdot \cos(\theta 1 - \theta 3) \cdot \frac{d\theta 1}{dt} \cdot \frac{d\theta 3}{dt}$$
[Equation 9]

However,
$$a' = M1 \cdot l1^2 + M2 \cdot L1^2 + I_{1G} + I_{m1} \cdot R1^2$$
$$= I1 + M2 \cdot L1^2 + I_{m1} \cdot R1^2 = a - I2$$
$$b = M2 \cdot L1 \cdot l2$$
$$c = M2 \cdot l2^2 + I_{2G} + I_{m2} \cdot R2^2 = I2 + I_{m2} \cdot R2^2$$

Introducing an equation of motion of each arm according to a Euler-Lagrange equation while taking care that the Lagrangian is equal to Ek', the output torque of the harmonic reduction gears 15 and 17 can be obtained as in [Equation 11]. Note that the effect of the viscosity term of friction etc. is ignored.

$$\frac{d}{dt} \left( \frac{\delta Ek'}{\delta \pi 1} \right) - \frac{\delta Ek'}{\delta \theta 1} = T1'$$
[Equation 10]

$$\frac{d}{dt} \left( \frac{\delta Ek'}{\delta \pi 3} \right) - \frac{\delta Ek'}{\delta \theta 3} = T2'$$

However, $\pi i = \frac{d\theta i}{dt}$  (i = 1, 3)

$$T1' = a' \cdot \frac{d^2\theta 1}{dt^2} + b \cdot \cos(\theta 1 - \theta 3) \cdot \frac{d^2\theta 3}{dt^2} +$$
$$b \cdot \sin(\theta 1 - \theta 3) \cdot \left( \frac{d\theta 3}{dt} \right)^2$$
[Equation 11]

$$T2' = c \cdot \frac{d^2\theta 3}{dt^2} + b \cdot \cos(\theta 1 - \theta 3) \cdot \frac{d^2\theta 1}{dt^2} -$$
$$b \cdot \sin(\theta 1 - \theta 3) \cdot \left( \frac{d\theta 1}{dt} \right)^2$$

In [Equation 11], the first term on the right side of the first equation of T1' shows an inertia term and the second term the inertia force (torque) received from the second arm d, and also, the third term shows torque where centrifugal force extends to the first arm 10 due to the rotation of the second arm 11.

Also, the first term on the right side of the second equation of T2' shows an inertia term, the second term the inertia force (torque) received from the first arm 10, and the third term shows torque where centrifugal force extends to the second arm 11 due to the rotation of the first arm 10.

Note that as is clear from a comparison with the previously described [Equation 5], although the Coriolis force of the first arm 10 is eliminated, interference of the inertia force and centrifugal force still remains.

Now, making b=0 in [Equation 11], interference can be eliminated and the following equation obtained.

$$T1' = a' \cdot \frac{d^2\theta 1}{dt^2}$$
[Equation 12]

$$T2' = c \cdot \frac{d^2\theta 3}{dt^2}$$

The above equation shows the dependence of the motion of the first arm 10 and second arm 11 on only the inertia terms themselves, the interference between the two arms being completely eliminated, thereby making it possible to build a non-interference system as a robot system.

Although the methods of (a) and (b) are as described above, in order to make b=0, there is a difference in the effects thereof in the robot system of FIG. 8 and the robot system of FIG. 1. In other words, in contrast, to the former in which the amount of interference between the arms is no more than reduced by making b=0, in the latter each arm can be controlled as an independent system by making b=0.

Note that in FIG. 1, although an example is shown wherein the support member 18 for supporting the motor 16 and the harmonic reduction gear 17 is fixed to the base 12, it is of course also permissible to attach the support member 18 to the base shaft portion 9.

Figure 4:
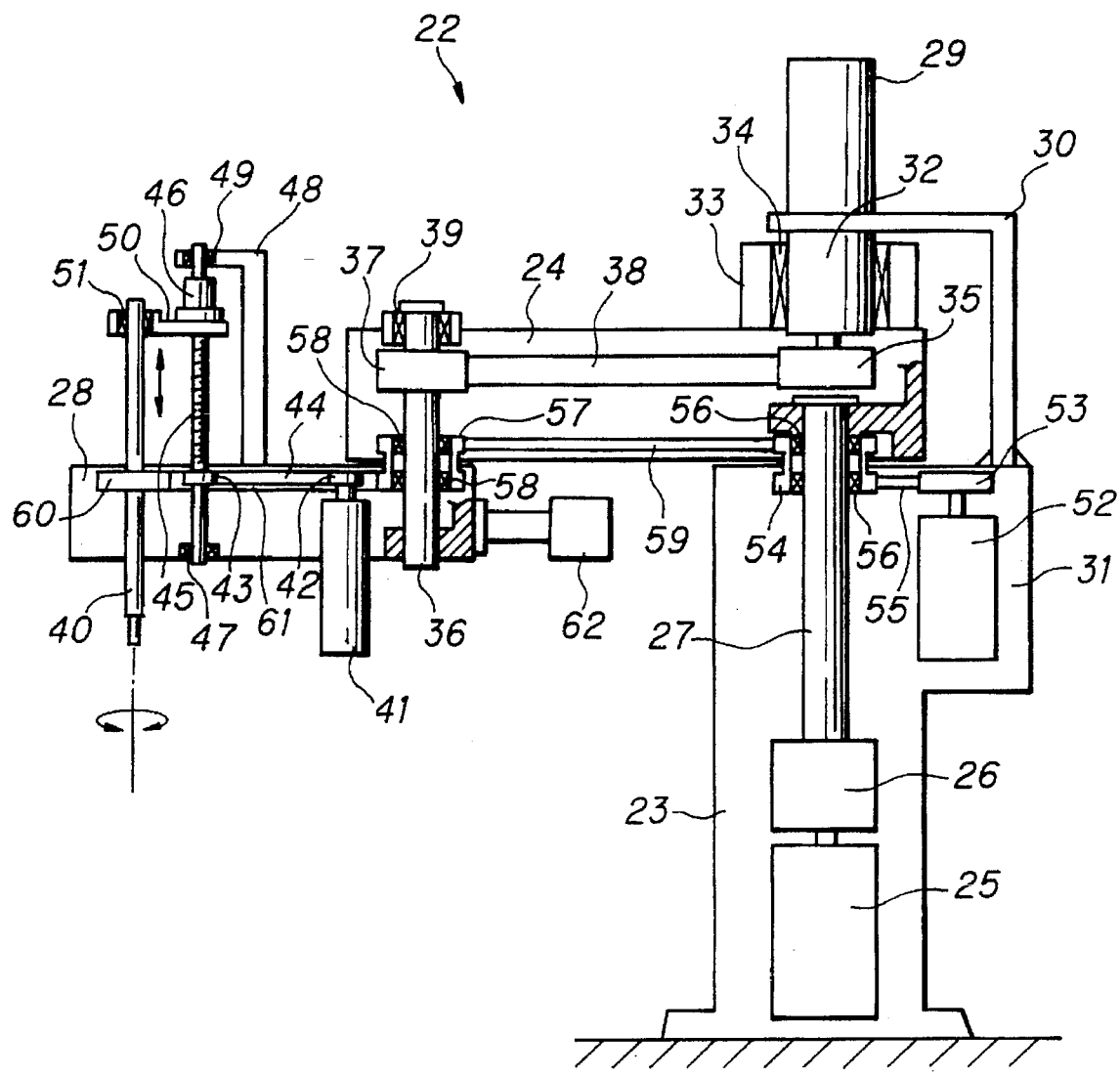
FIG. 4 is a transparent side view showing in outline a structural example of an articulated robot according to the present invention.
Figure 5:
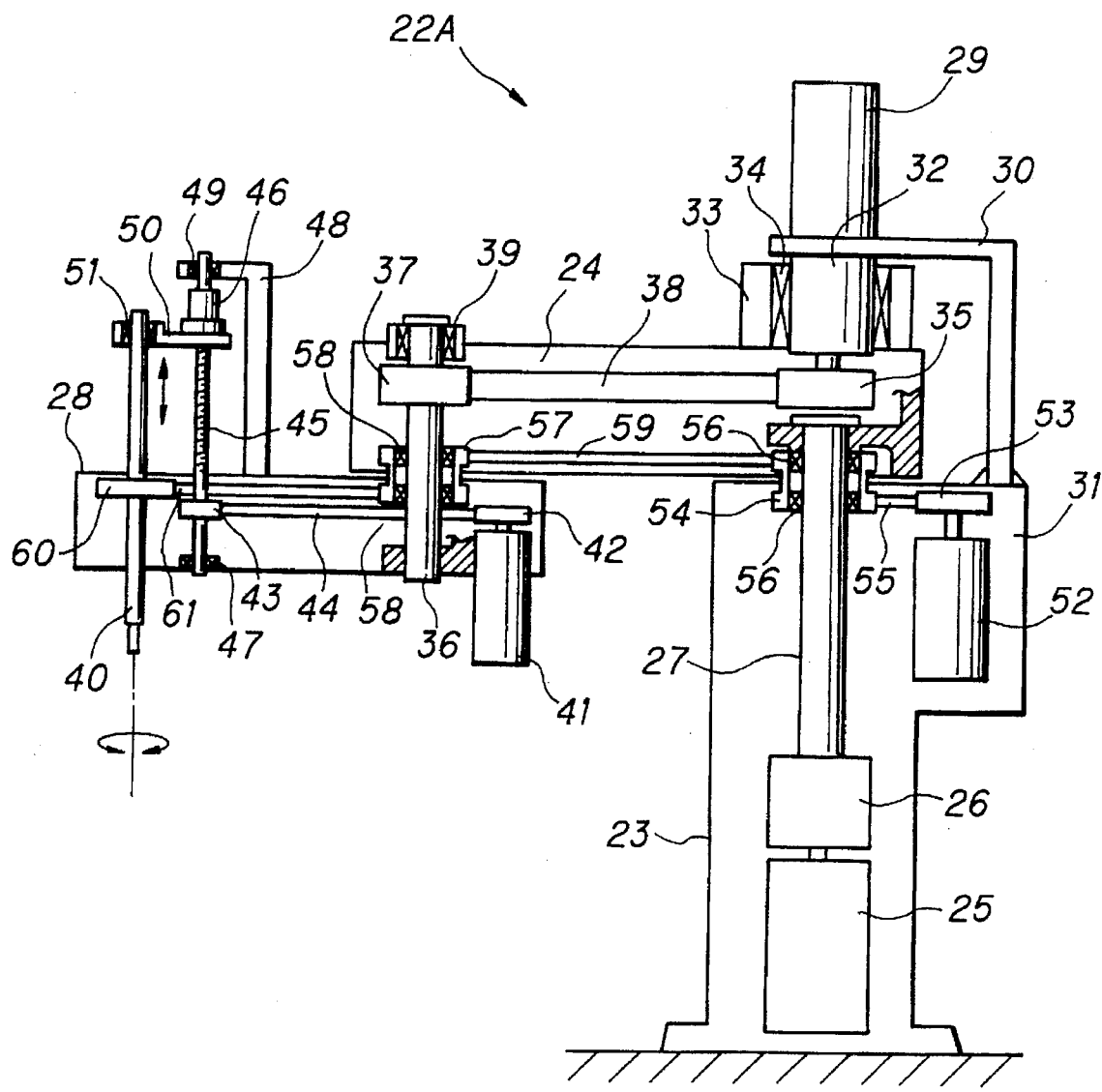
FIG. 5 is a transparent side view showing in outline a modified example of an articulated robot according to the present invention.

FIG. 4 and FIG. 5 show in outline a structural example of a robot incorporating the above items (I) and (II).

In the robot 22 shown in FIG. 4, a motor 25 and harmonic reduction gear 26 for rotating a first arm 24 are provided in a base shaft portion 23 thereof, the driving of the motor being transmitted to a rotation shaft 27 fixed to an output shaft of the harmonic reduction gear 26. Also, the upper end portion of the rotation shaft 27 is fixed to the first arm 24.

28 is a second arm and 29 is a motor for rotating the second arm 28. The motor 29 is fixed to a support member 30 in an L shape as seen from the side, the lower end portion of the support member 30 being fixed to an upper end surface of a motor housing portion 31 and projecting sideways from the side surface of the base shaft portion 23.

32 is a harmonic reduction gear which is fixed to the lower surface of the support member 30. A bearing holder 33 is attached to the upper surface of the first arm 24, the harmonic reduction gear 32 being supported via a bearing 34 provided in the inner peripheral surface thereof. In other words, since the harmonic reduction gear 32 is fixed to the support member 30, a structure can be obtained which does not cause hindrance to the rotation of the first arm 24 by supporting the harmonic reduction gear 32 using the bearing 34.

The output shaft of the harmonic reduction gear 32 is disposed on the same axis as the above-described rotation shaft 27, a pulley 34 is fixed to the lower end portion thereof, and a steel belt 38 is extended between the pulley 35 and a pulley 37 fixed to the rotating shaft 36 of the second arm 28. Note that the upper end portion of the rotation shaft 36 is supported by a bearing 39 provided in the rotating end portion of the first arm 24, the tower end portion thereof being fixed to the second arm 40 is a tool mounting shaft the sliding along the up and down directions and rotation around an axis being performed by separate motors.

A motor 41 provided in proximity to the rotation shaft 36 is the drive source for sliding the tool mounting shaft 40 is the up and down directions, a steel belt 44 being extended between a pulley 42 fixed to the output shaft thereof and a pulley 43 arranged at a predetermined distance in a direction approaching the tool mounting shaft 40.

The pulley 43 is provided for rotating a bait screw 45 extending horizontally in proximity to the tool mounting shaft 40, a ball nut 46 coupled thereto being moved in the up and down directions by the rotation of the ball screw 45. Note that the lower end portion of the ball screw 45 supported by a bearing 47 and the upper end portion thereof is supported by a bearing 49 provided in a guide member 48 in the upper surface of the second arm 28.

50 is a support member for the tool mounting shaft 40 and is fixed to the ball nut 46. The upper end portion of the tool mounting shaft 40 is rotatably supported by a bearing 51 provided in a support member Thereby, the ball screw 45 is rotated by transmission of the driving power of the motor 41 from the pulley 42 to the pulley 43 via the steel belt 44, the ball, nut 46 and the support member 50 being moved along the up and down directions and the up and down movement of the tool mounting shaft 40 being thereby performed.

Rotation of the tool mounting shaft 40 is performed by a mechanism using pulleys and a steel bent with the motor 52 provided in the motor housing portion 31 of the base shaft portion 23 as the driving source.

In other words, a pulley 53 is fixed to the output shaft of the motor 52, and a steel belt 55 is extended between this pulley 53 and the lower portion of an intermediate pulley 54 externally inserted in the rotation shaft 27. Note that the intermediate pulley 54 is externally inserted in a rotatable state in the rotation shaft 27 via bearings 56 add 56. Also, an intermediate pulley 57 is externally inserted in a rotatable state via bearings 58 and 58 in the rotation shaft 36 of the second arm 28, a steel belt 59 being extended between the upper portion thereof and the upper portion of the above intermediate pulley 57. Also, a steel belt 61 is extended between a pulley 60 externally inserted in the tool mounting shaft 40 and the lower portion of the intermediate pulley 57.

Thereby, the driving force of the motor 52 is transmitted to the intermediate pulley 54 via steel belt 55 and further transmitted to the intermediate pulley 57 and pulley 60 via steel belts 59 and 61 to become the rotational power of the tool mounting shaft 40. Note that the weight of the second arm 28 is alleviated by disposing the motor 52 in the base shaft portion 23 in this manner.

A counterweight 62 is attached to the end port,on of the second arm 28 on the rotation shaft 36 side, and is provided in order to position the center of gravity of the second arm 28 over the rotation shaft 36.

Note that, as show in the robot 22A in FIG. 5, the permissibility of using the motor 41 or the up and down movement of the tool mounting shaft 40 as a counterweight is as previously described. In other words, it is permissible to arrange the motor 41 at the end portion of the second arm 28 on the rotation shaft 36 side.

FIG. 6 and FIG. 7 show differences in motor currents of a conventional robot (having the structure of FIG. 8) and a robot according to the present invention when operated in a given orientation.

FIG. 6 shows in outline the wave forms of motor currents of a conventional robot, and in this drawing "I(1)" indicates the current of a motor f and "I(2)" indicates the current of a motor i. Note that the horizontal axis t of the graph indicates time.

Figure 6A:
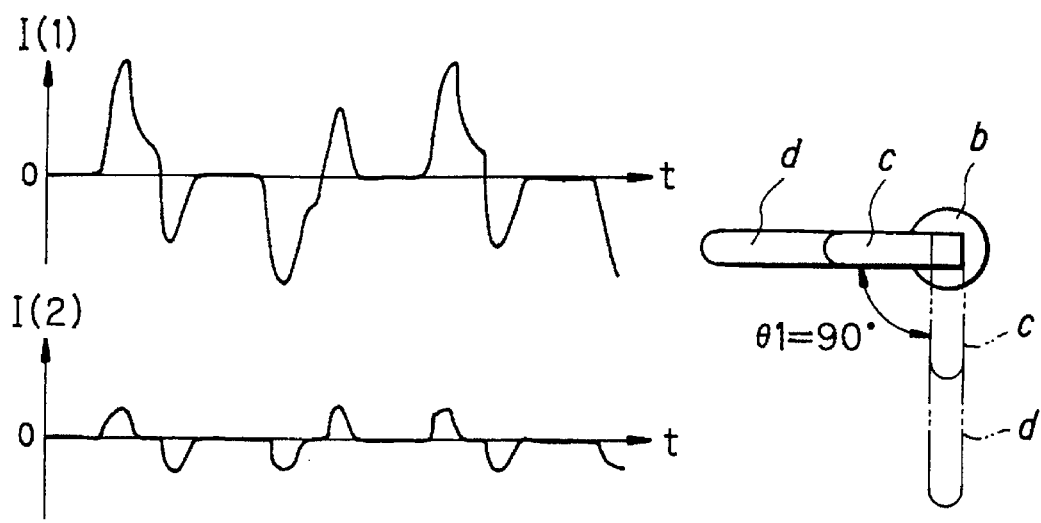
FIG. 6(a) is a diagram showing motor currents together with arm movements with respect to a conventional articulated robot in a case where only the first arm is moved.
Figure 6B:
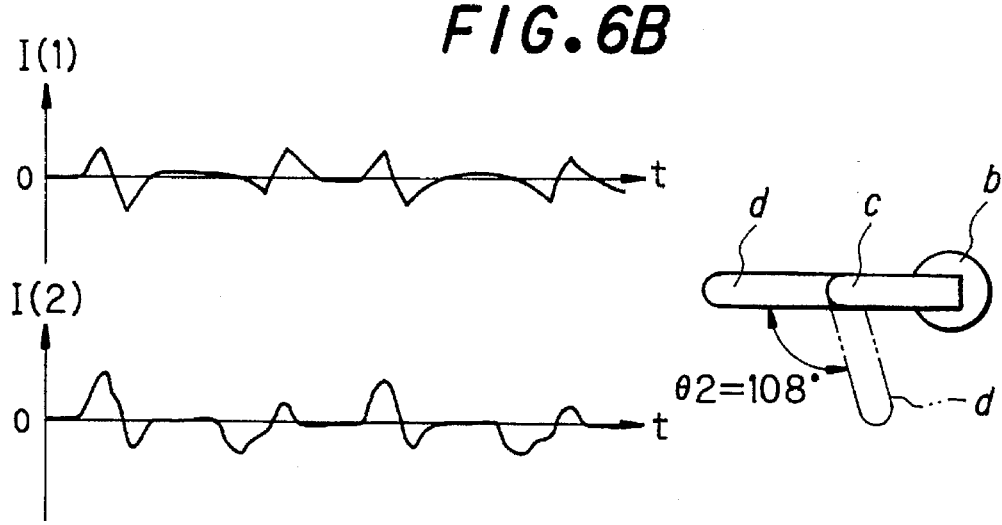
FIG. 6(b) is a diagram showing motor currents together with arm movements with respect to a conventional articulated robot in a case where only the second arm is moved.

The waveform graph shown on the left side of FIG. 6(a) shows an electrical current waveform in a case where only the first arm c shown in the right side diagram is rotated 90° (θ1=90°, θ2=0°), and the waveform graph shown on the left side of FIG. 6(b) shows an electrical current waveform in a case where only the second arm d as shown in the right side diagram is rotated 108° (θ1=0°, θ2=108°). Also, in FIG. 6(c) the waveform shown on the left is an electrical current waveform in the case where an operation combining the operations of FIG. 6(a) and FIG. 6(b) as shown in the right hand diagram is performed, i.e. in the case where the second arm d is rotated 108° while the first arm c is rotated 90° (θ1=90°, θ2=108°).

Figure 6C:
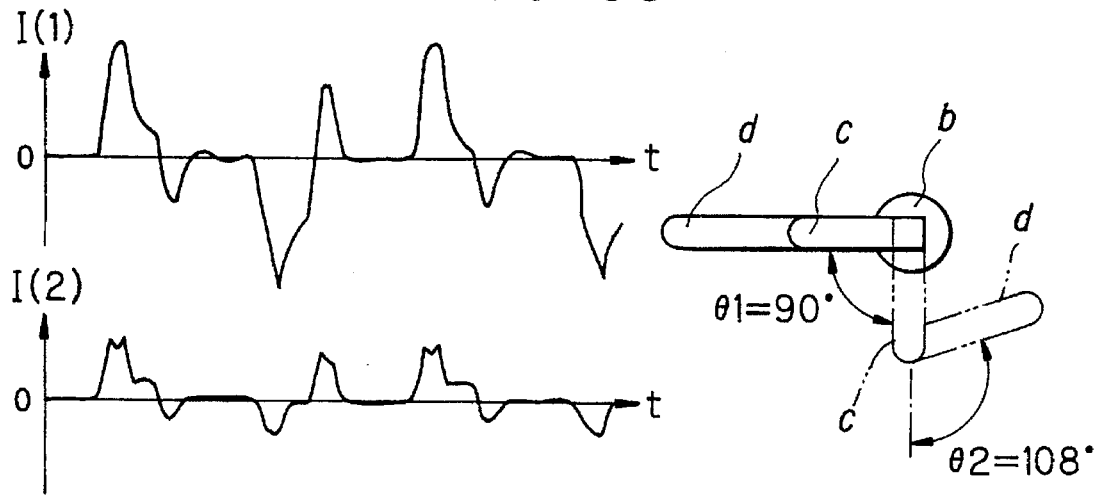
FIG. 6(c) is a diagram showing motor currents together with arm movements with respect to a conventional articulated robot in a case where the first arm and the second arm are moved.

As shown in FIG. 6(a) and FIG. 6(b), an electrical current also circulates in the drive motor of the arm which is not rotated, and it is understood that the electrical current waveform of FIG. 6(c) is not a waveform formed by overlapping the electrical current waveform of FIG. 6(a) and the electrical current waveform of FIG. 6(b).

FIG. 7 shows in outline the wave forms of electrical currents of motors of the robot according to the present invention, and in this drawing "I(1)" indicates the electrical current of the motor 25 and "I(2)" indicates the electrical current of the motor 20. Note that the horizontal axis t of the graph indicates time.

The waveform graph on the left side of FIG. 7(a) shows an electrical current waveform in the case where the first arm 24 only, as shown in the diagram on the right side, is rotated 90° (θ1=90°, θ3=0°), and the waveform shown on the left side in FIG. 7(b) shows the electrical current waveform in the case where only the second arm 28 as shown in the right side diagram is rotated 108° (θ1=0°, θ3=108°). Note that the fact that θ3=0° in FIG. 7(a) is due to the above item (II), and it is necessary to note the point which means that the second arm 28 before rotation of the first arm 24 and the second arm 28 after rotation of the first arm 24 are parallel. Also, the waveform chart shown on the left side in FIG. 7(c) shows electrical wave forms in the case where a combined operation of the operations of FIG. 7(a) and FIG. (b) as shown in the diagram on the right is performed, i.e. in the case where the second arm 28 is rotated 108° while first arm 24 is rotated 90° ($\theta 1=90°$, $\theta 3=108°$).

As shown in FIG. 7(a) and FIG. 7(b), the electrical current of the drive motor of the arm which is not rotated is substantially 0, and each electrical current waveform of FIG. 7(c) is an overlapping of the electrical current waveform of FIG. 7(a) and the electrical current waveform of FIG. 7(b) or a waveform inclined theretowards, this being supported by the first arm 24 and second arm 28 forming a non-interference system as shown in [Equation 12].

In addition, with regard to the belt 21 in FIG. 1, although it is necessary to apply suitable tension, setting of suitable tension while performing positioning so that the rotation shaft of the first arm 10 and output shaft of the harmonic reduction gear 17 are coaxial is very difficult. Also, even where suitable tension is applied in an initial state, it is possible that the tension changes due to aging and surrounding temperatures. In such cases, it is necessary to perform re-adjustment of the tension.

Given the above, in another embodiment as shown in FIG. 9, the harmonic reduction gear 17 of FIG. 1 is rendered movable and a mechanism capable of minute adjustment of the gap between the pulley 19 and the pulley 20 is provided. However, where the harmonic reduction gear 17 only is simply moved, as shown in FIG. 8 a problem occurs in that the tension of the belt 21 changes according to the rotation state of the first arm 10. Consequently, in the embodiment shown in FIG. 9, a mechanism for avoiding this problem is provided.

FIG. 8 shows in outline the robot 8 of FIG. 1 seen from the horizontal plane, "A1" indicating the axis of rotation of the first arm 10 and "A2" indicating the axis of rotation of the second arm 11.

In a case where the drive shaft of the motor 16 and the drive shaft of the harmonic reduction gear 17 are moved on an elongated line of line A1–A2 as shown by "B" in order to apply tension to the belt 21, where the first arm 10 rotates from the state shown by the double-dotted line to the state shown by the solid line, a gap L' (i.e. the length of the line A2'-B) between an axis of rotation (this is represented by "A2") of the second arm 11 and the axis B after rotation and a gap L (i.e. the length of the line A2-B) between the axis of rotation A2 and axis B before rotation differ. This is because the position of the axis B cannot change along with the rotation of the first arm 10, as is cigar from motor 16 and harmonic reduction gear 17 being fixed to the support member 18.

FIG. 9 shows in outline another structural example of a horizontal articulated robot according to the present invention.

101 is a robot, a motor 104 and harmonic reduction gear 105 for rotating a first arm 103 being provided in the base shaft portion 10102 thereof, and the driving power of the motor 104 being transmitted to a rotation shaft 106 fixed to the output shaft of the harmonic reduction gear 105. Also, the upper end portion of the rotation shaft 106 is fixed to the first arm 103.

107 is a second arm, a motor 108 and harmonic reduction gear 109 for rotating the second arm 107 being fixed to a housing 110.

The housing 110, as well as being received in a bearing holder 111 attached to the upper surface of the first arm 103, is supported by bearings 112 and 113 provided in the inner peripheral surface of the bearing holder 111.

114 is a support member for the housing 110, and is mounted on the upper end surface of a motor housing portion 102a protruding sideways from the side surface of the base shaft portion 102. Also, the housing 110 communicates with the upper end portion of the support member 114 via a support arm 115 fixed thereto. Note that the support arm 115 is not fixed to the support member 114, but is rotatable with respect to the support member 114 as described below and is supported by the support member 114 in a slidable state along the length direction of the first arm 103.

The output shaft of the harmonic reduction gear 109 is disposed substantially coaxial to the above rotation shaft 106, a pulley 16 is fixed to the lower end portion thereof, and a steel belt 119 is extended between this pulley 116 and a pulley 118 fixed to the rotation shaft 117 of the second arm 107. Note that tension adjustment of the steel belt 119 is performed by displacing the above bearing holder 111 along a horizontal direction, a detailed description of which will be given below.

The upper end portion of the rotation shaft 117 is supported by a bearing 120 provided in the rotating end portion of the first arm 103 and the lower end portion thereof is fixed to the second arm 107.

121 is a tool mounting shaft, sliding along the up and down direction and rotation around a an axis thereof being performed by separate motors.

A motor 122 provided in proximity to the rotation shaft 117 of the second arm 107 is a drive source for sliding the tool mounting shaft 121 in the up and down directions, a steel belt 125 extending between a pulley 123 fixed to the output shaft thereof and a pulley 124 disposed at a fixed distance in a direction towards the tool mounting shaft 121 therefrom.

The pulley 124 is provided in order to rotate a ball screw 126 which extends parallel and in proximity to the tool mounting shaft 121 and a ball nut 127 engaged therewith moves in the up and down directions by means of rotation of the ball screw 126. Note that the lower end portion of the ball screw 126 is supported by the second arm 107 by means of a bearing 128 and the upper end portion thereof is supported by a bearing 130 provided in a guide member 129 mounted on the upper surface of the second arm 107.

131 is a support member for the tool mounting shaft 121 and is fixed to the ball nut 127. The upper end portion of the tool mounting shaft 121 is rotatably supported by a bearing 132 provided in the support member 131.

The driving power of the motor 122 is transmitted from the pulley 123 to the pulley 124 via the steel belt 125, the ball screw 126 being rotated thereby, to move the ball nut 127 and support member 131 in the up and down directions and perform up and down movement of the tool mounting shaft 121.

The rotation of the tool mounting shaft 121 is performed by a mechanism using the pulleys and steel belt with the motor 133 provided in the motor housing portion 102a of the base shaft portion 102 as a drive source.

In other words, a pulley 134 is fixed to the output shaft of the motor 133 and a steel belt 136 extends between the pulley 134 and the lower portion of an intermediate pulley 135 rotatably supported in an externally fitted state by the rotation shaft 106 of the first arm 103. Note that the intermediate pulley 135 is rotatably supported by the rotation shaft 106 via bearings 137 and 137. A intermediate pulley 138 is rotatably supported by the rotation shaft 117 of the second arm 107 via bearings 139 and 139, a steel belt 140 extending between the upper portion thereof and the upper portion of the above intermediate pulley 138. Also, a steel belt 142 extends between a pulley 141 externally inserted on the tool mounting shaft 121 and the lower portion of the intermediate pulley 138. Thereby, the drive power of the motor 133 is transmitted to the intermediate pulley 135 via the steel belt 136, is further transmitted to the intermediate pulley 138 and the pulley 141 via steel belts 140 an 142 to become the rotating power for the tool mounting shaft 121. Note that the weight of the second arm 107 is alleviated by disposing this motor 133 in the base shaft portion 102.

143 is a counterweight attached to the end portion of the second arm 107 on the rotation shaft 117 side, and provided for positioning the center of gravity of the second arm 107 over the rotation shaft 117.

FIGS. 10 through 15 show the rotation mechanism for the second arm 107 and the support mechanism for the housing 110.

The housing 110 is formed so as to have a substantially inverted cone shape having a smaller diameter towards the lower portion compared to towards the upper portion, the harmonic reduction gear 109 being housed in the interior 144 thereof.

Also, the motor 108 is fixed to the upper end surface of the housing 110 by a bolt, an output shaft 108a of the motor 108 extending in the up and down directions being fixed to an input shaft 109a of the harmonic reduction gear 109.

An output shaft 109b of the harmonic reduction gear 109 is rotatably supported by ball bearings 145 and 146 internally fitted in the housing 110, the pulley 116 being fixed to the lower end portion of the output shaft 109b.

The housing 110 is supported by bearings 112 and 113 in the bearing holder 111 as previously described, the lower end portion thereof being inserted in the first arm 103 through an insertion hole 103a formed in the upper surface of the first arm 103. Note that ball bearings are used in the bearings 112 and 113.

The bearing holder 111 comprises an attachment plate 147a and a holder portion 147b, both of which are joined by bolts 148, 148, . . .

Insertion holes 149, 149, . . . are formed at predetermined angular intervals at positions near the outer periphery, the attachment plate 147a being fixed to the first arm 103 by inserting bolts 150, 150, . . . in these insertion holes 149, 149, . . . to screw them together with screw holes 151, 151, . . . formed in the upper surface of the first arm 103. Note that the whole diameter of the insertion holes 149, 149, . . . are slightly larger than the diameter of the threads of the bolts 150, 150, . . .

152 is a setting bolt for tension adjustment, and is supported in a prism 153 provided immediately before the bearing holder 111 (herebelow, the direction towards the rotation shaft 117 of the second arm 107 will be taken as the forward direction and the direction away from the rotation shaft 117 of the second shaft 107 will be taken as the rearward direction). The setting bolt 152 is such that a screw portion 152a thereof screws into a threaded hole 153a of the prism 153, and by enclosing the setting bolt 152, the end portion thereof can urge the side surface of the attachment plate 147a of the bearing holder 111 rearward to displace the bearing holder 111 rearward.

154 is a bearing cap for the bearing 113 and is externally fitted to the housing 110.

155 is a U-nut and is externally fitted to the housing 110 immediately below the bearing cap 154.

Figure 11:
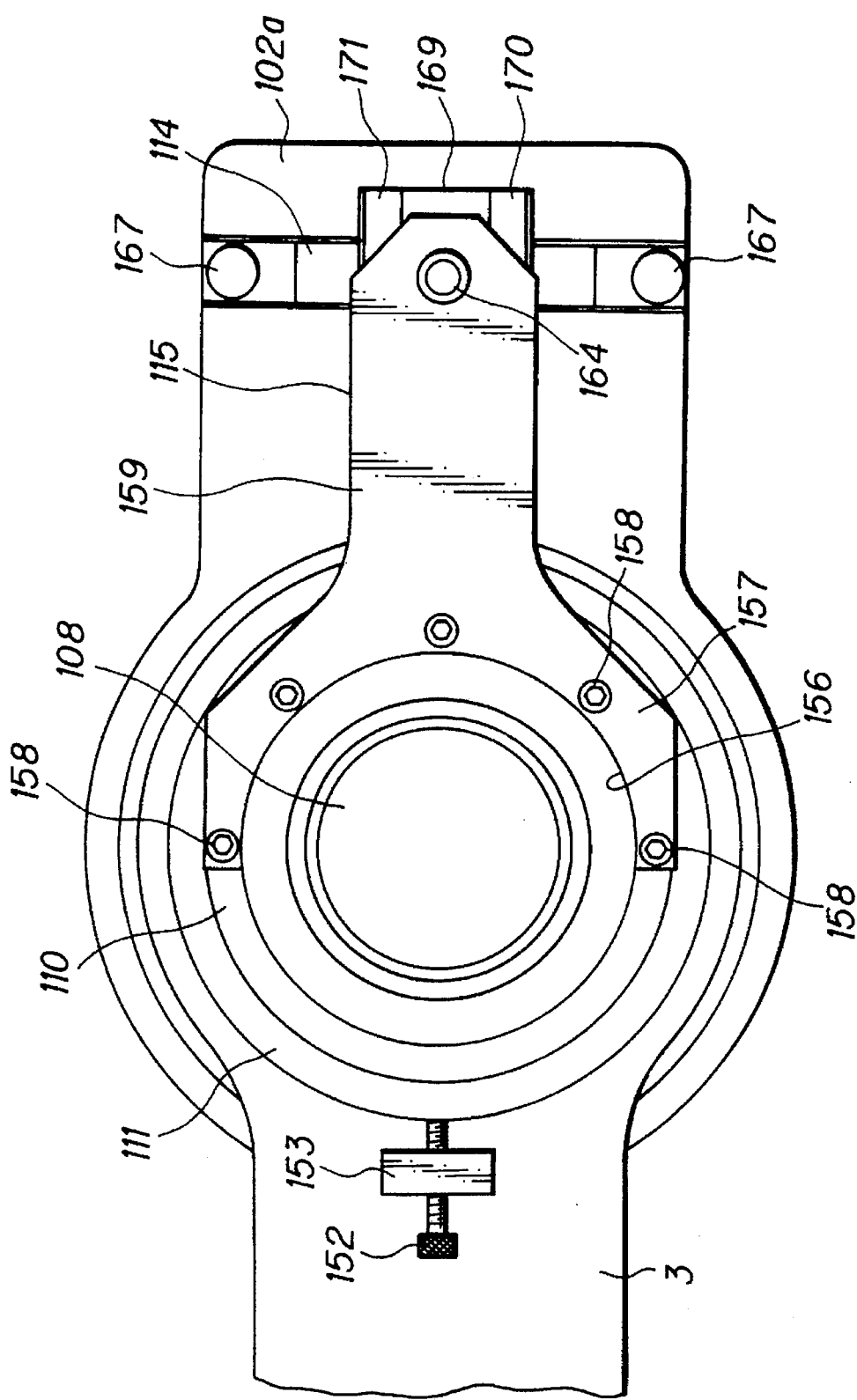
FIG. 11 is an enlarged side view of the main components of the articulated robot shown in FIG. 8.
Figure 12:
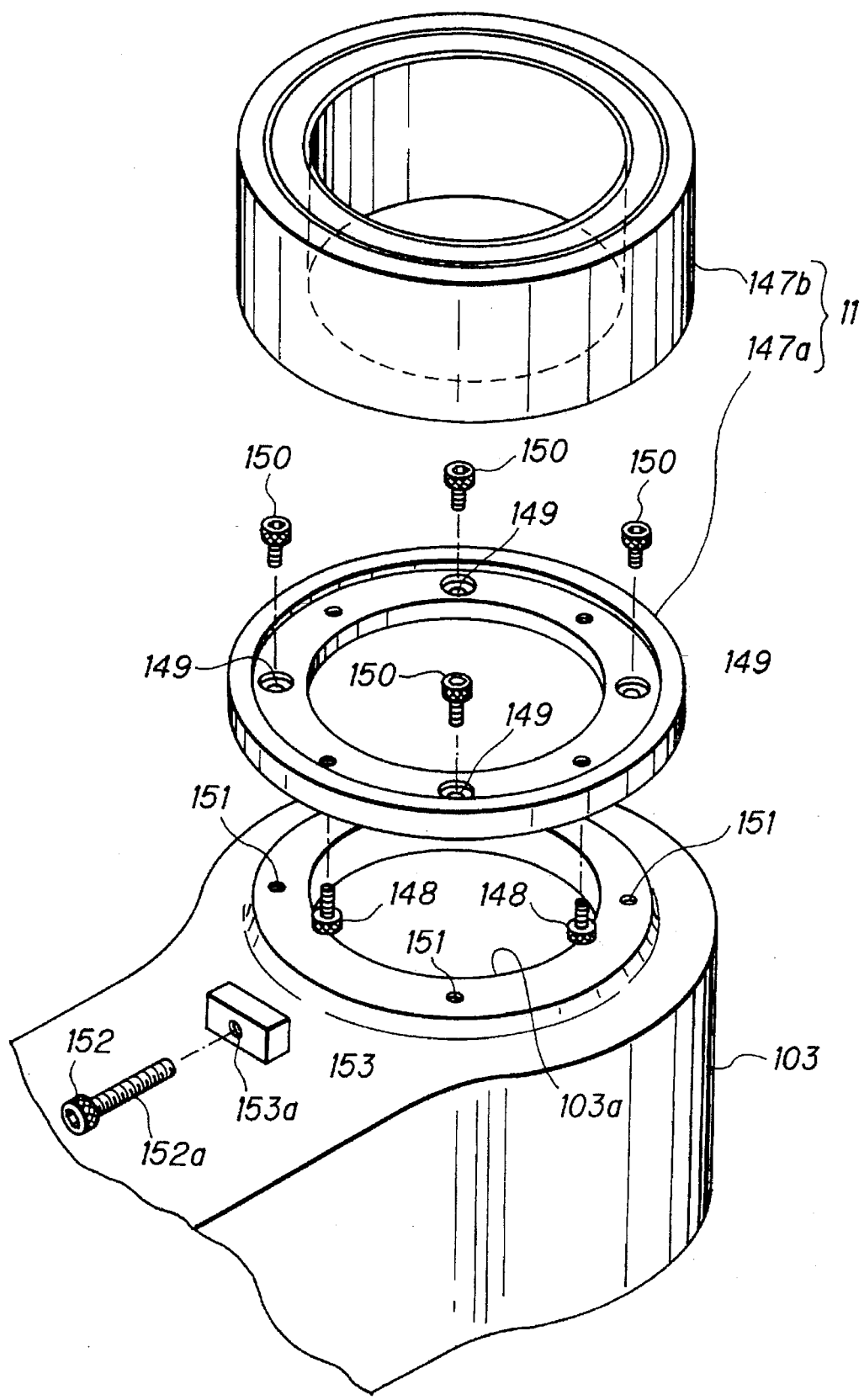
FIG. 12 is an exploded perspective view of the main components of the articulated robot shown in FIG. 8, showing attachment of the housing to the first arm.

The support 115 of the housing 110, as shown in FIG. 11, has a substantially Y shape seen horizontally, and an attachment portion 157 in which an semi-circular shaped indented portion 156 is formed conforming to the side surface shape of the motor 108 is attached to the upper surface of the housing 110 by the bolts 158, 158, . . .

Figure 13:
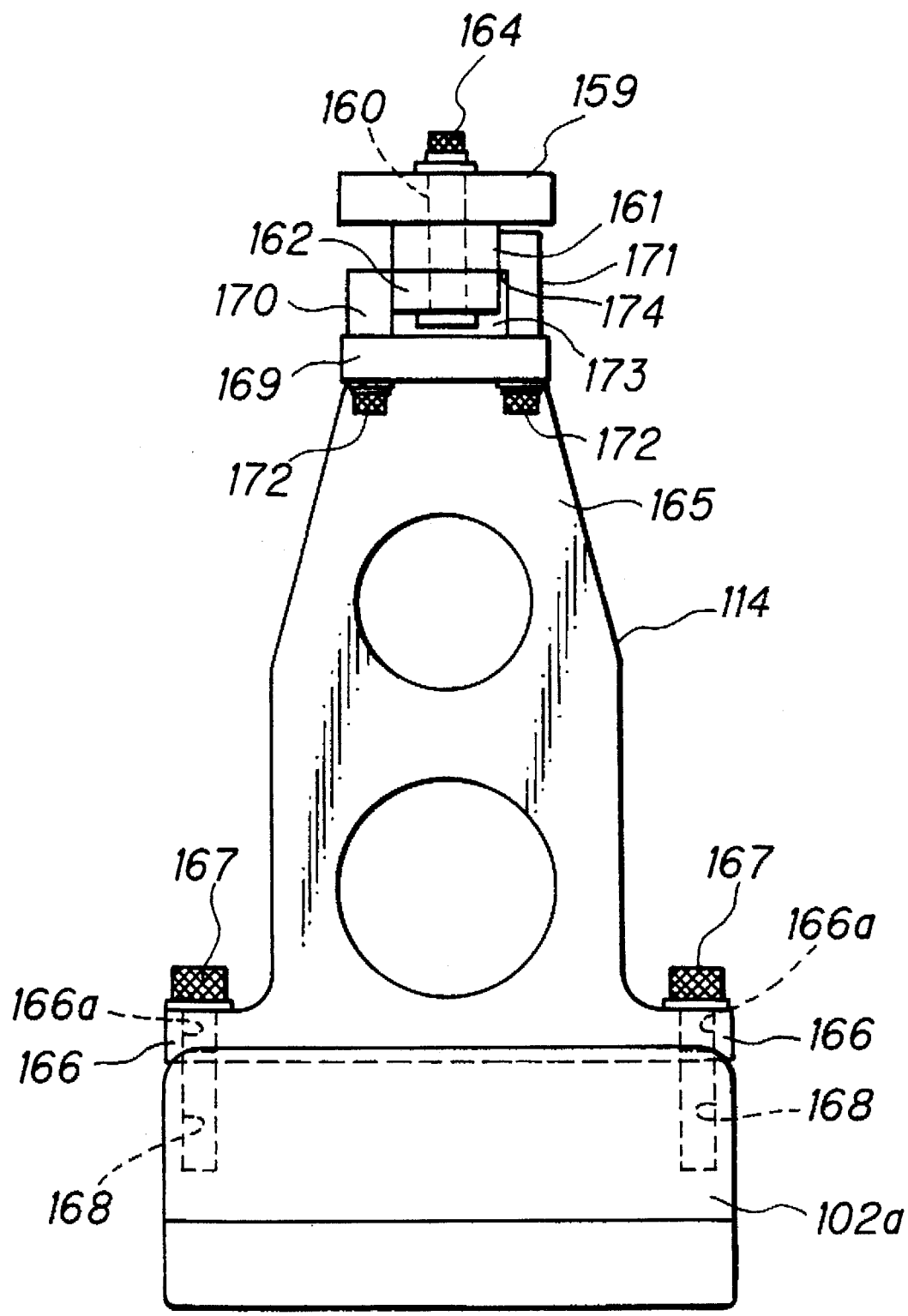
FIG. 13 is an enlarged side view showing the support arm and support member of the housing shown in FIG. 11.
Figure 14:
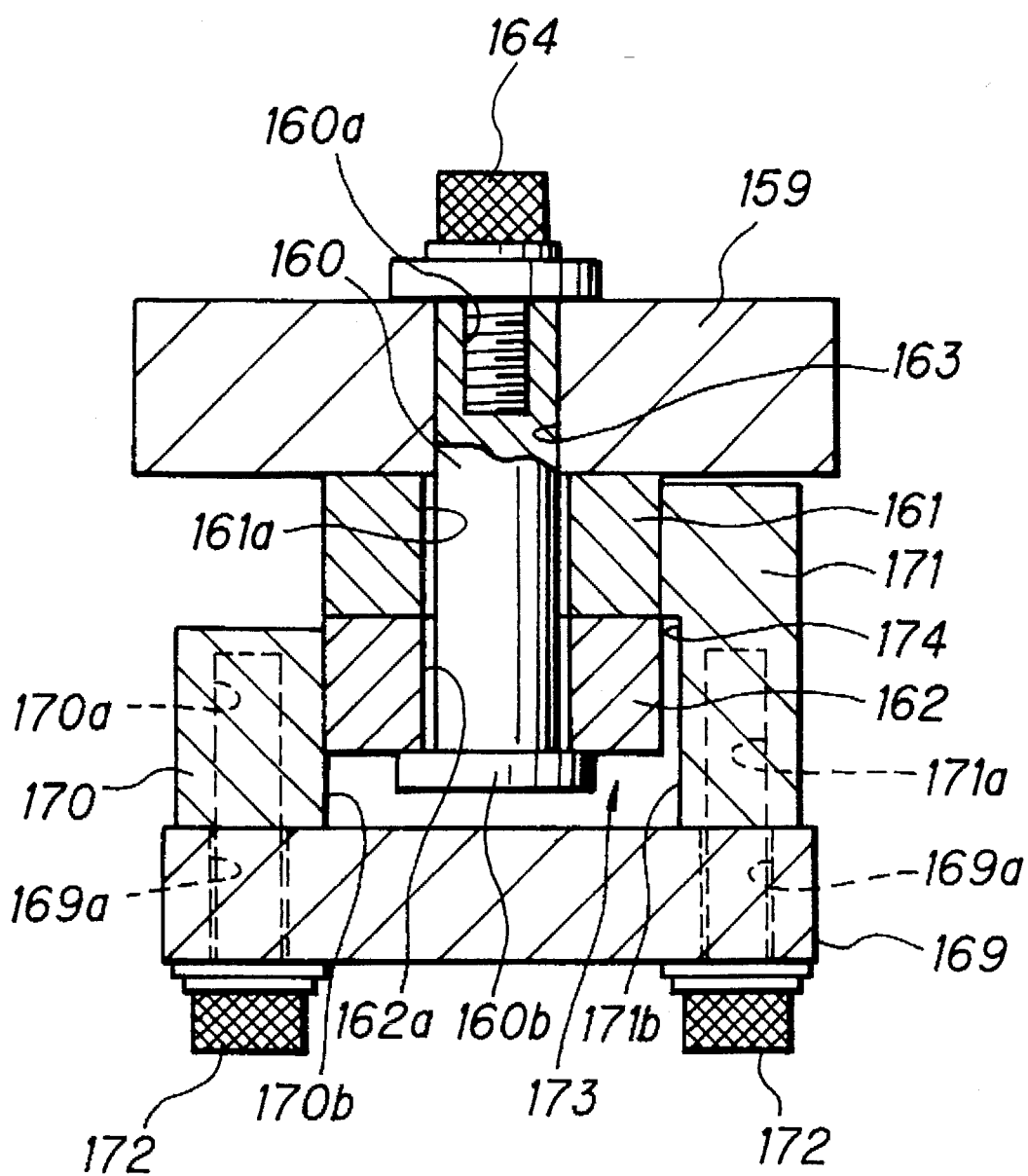
FIG. 14 is an enlarged cross-sectional view showing the main components of the support arm and support member of the housing shown in FIG. 12.
Figure 15:
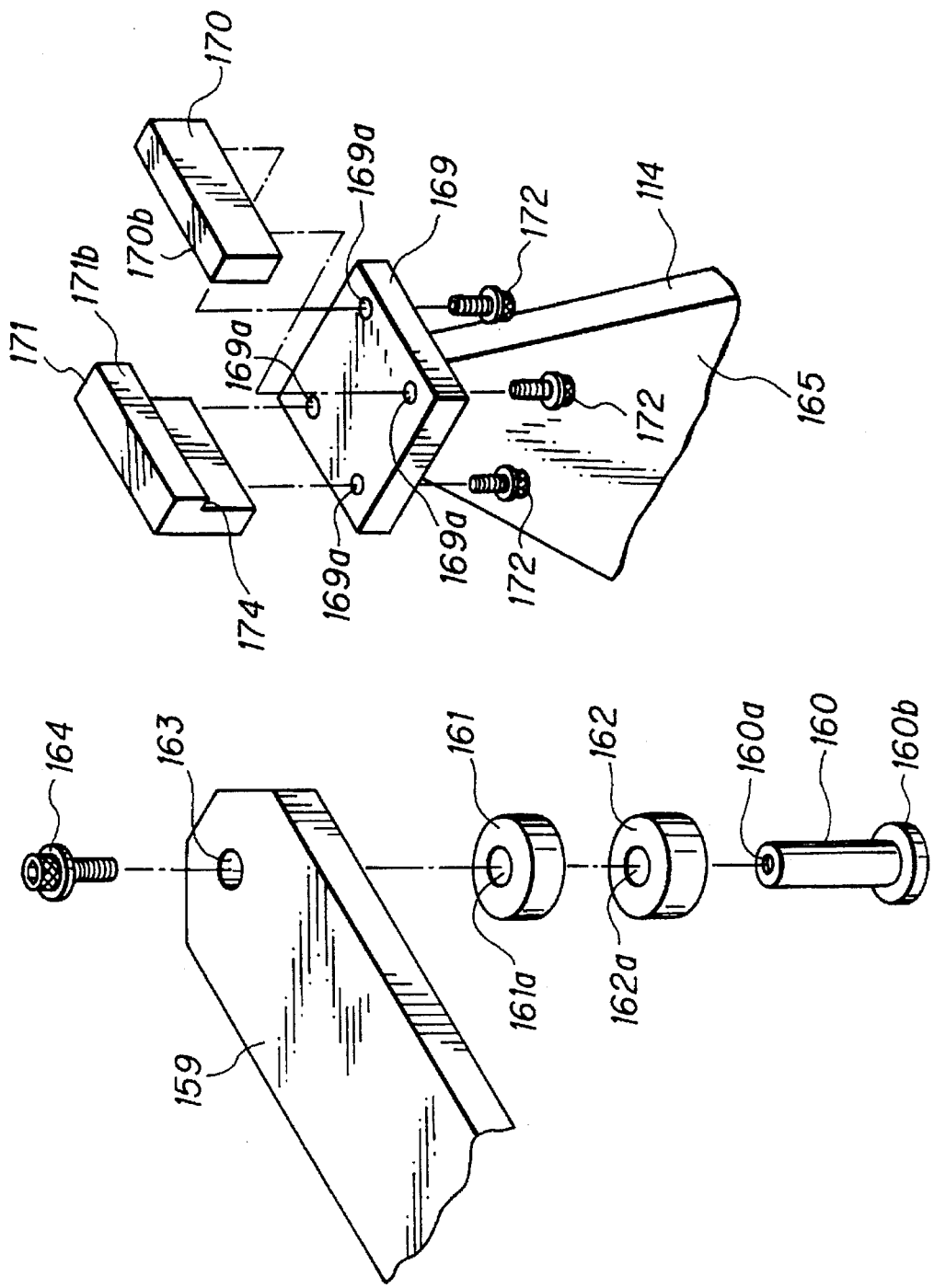
FIG. 15 is an exploded perspective view of the main components of the support arm and support member of the housing, illustrating the connection state thereof.

Also, two rollers 161 and 162 are rotatably supported by a shaft 160 in a location towards the rear end of the arm portion 159 protruding rearward from the attachment portion 157, and shown in FIG. 13 through FIG. 15. In other words, an insertion hole 163 is formed in the end portion of the arm portion 159, and the shaft 160 is attached to the arm portion 159 by inserted it through the insertion holes 161a and 162a formed in these rollers 161 and 162 and thereafter further inserting it through an insertion hole 163 and screwing a bolt 164 with washer from the top of the arm portion 159 into a thread 160a formed in one end portion of the shaft 160. Note that the rollers 161 and 162 are supported in a rotatable state between the lower surface of the arm portion 159 and the top portion 160b of the shaft 160, and the roller 161 is disposed above the roller 162.

The support member 114, as shown in FIG. 11 and FIG. 13, has a main portion 165 of a flat plate shape and attachment portion 166 and 166 formed in the lower end portion of the main portion 165. Bolts 167 and 167 are inserted from above in insertion holes 166a and 166a in the attachment portions 166 and 166, and screwed respectively into threaded holes 168 and 168 formed in the upper portion of the motor housing portion 102a, whereby the support member 114 is fixed to the upper portion of the motor housing portion 102a.

The main portion 165 of the support member 114, as shown in FIG. 13, becomes narrow towards the top from the center thereof, a square plate shaped platform portion 169 being integrally formed with the main portion 165 at the upper end portion thereof.

Also, two guide plates 170 and 171 whose heights differ are attached to the platform portion 169. The guide plates 170 and 171 are both substantially of a square plate shape, and are arranged extending in the forward direction in a location towards the end of the upper surface of the platform portion 159 and having a mutually parallel positional relationship, the height of the guide plate being lower than that of the guide plate 171. Note that attachment of these guide plates 169 is performed by respectively screwing bolts 172, 172, . . . into each of the threaded holes 170a, 170a, 171a and 171a formed in the lower surfaces of the guide plates 170 and 171 after inserting them through insertion holes 169a, 169a, . . . formed in the platform portion platform port,on 169 from below.

A groove 173 formed by the mutually opposing surfaces of the upper surface of the platform 169 and the guide plates 170 and 171 functions as a guide groove for the above-described rollers 161 and 162. In other words, as shown in FIG. 14, it directs the inner side surface 170b of the guide plate 170 to contact the outer peripheral surface of the lower side of the roller 162, and also directs the surface towards the top end of the inner side surface 171b of the guide plate 171 to contact the outer peripheral surface of the upper side roller 161. Note that when the roller 162 is sandwiched between the inner side surface 170b of the guide plate 170 and the inner side surface 171b of the guide plate 171, rotation of the roller 162 is impossible, therefore a step 174 is formed in the inner side surface 170b so that the inner side surface 171b of the guide plate 171 does not contact the outer peripheral surface of the roller 162, the portion towards the upper part of the inner side surface 170b only contacting the outer peripheral surface of the roller 162.

However, the guide arm 115, whose rollers 161 add 162 are received in the guide groove 173 and are rotatably supported with respect to the support member 114, and are supported by the support member 114 in a slidable state in the forward and rearward directions along the guide groove 173, so that upon the second arm 107 being moved, the support arm 115 serves to stop rotation of a unit (herebelow referred to as "motor unit") including the housing 110 and motor 108, harmonic reduction gear 109, and the pulley 116.

In tension adjusting the steel belt 119, the bearing holder 111 is attached to the upper surface of the first arm 103 by tightening the bolts 150, 150, . . . , approximate positioning of the motor unit is performed, and the steel belt 119 is wound onto the pulley 116.

Also, the setting bolt 152 for tension rotated and fine adjustment of the tension of the steel belt 119 is performed by displacing the bearing holder 111 in the forward and rearward directions, and the position of the bearing holder upon completion of adjustment by locking the bolts 150, 150, . . . is confirmed. Note that at the time of tension adjustment the rollers 161 and 162 move in the forward and rearward directions while rolling inside the guide groove 173 together with displacement of the bearing holder 111.

At the time of completion of tension adjustment, although it is clear that the output shaft 109b of the harmonic reduction gear 109 does not definitely conform to the rotation shaft 106 of the first arm 103, in the robot 101 there is no change in tension of the steel belt 119 accompanying rotation of the first arm 103, and also, as described above, the housing 110 is not fixed to the support member 114 via the support arm 115 thereof and the gap between the housing 110 and support member 114, therefore support of the housing 110 by means of the support arm 115 and support member 114 does not hinder rotation of the first arm 103.

Figure 16A:
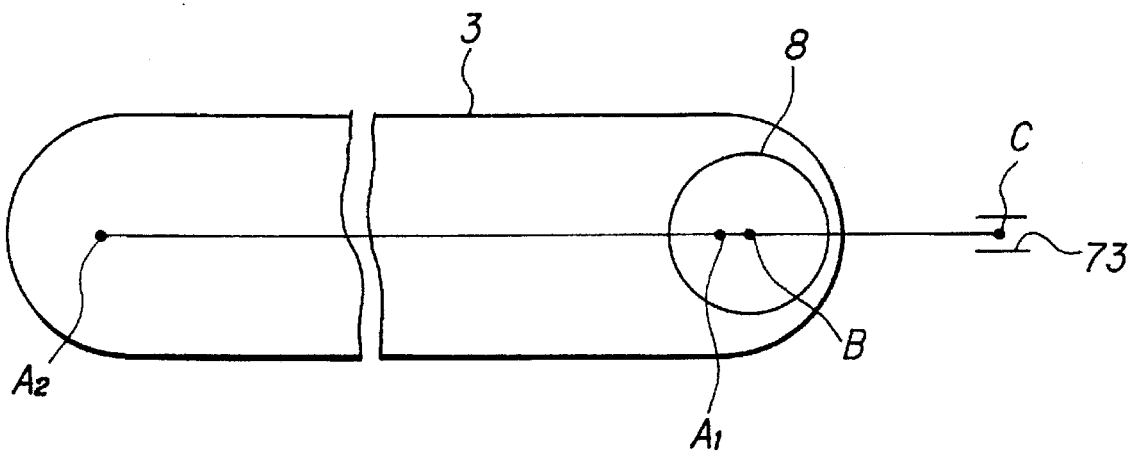
FIG. 16(a) is a horizontal outline view for explaining tension adjustment within the articulated robot and the positional relationship between rotation of the first arm and support of the housing thereafter, showing the state before rotation of the first arm.
Figure 16B:
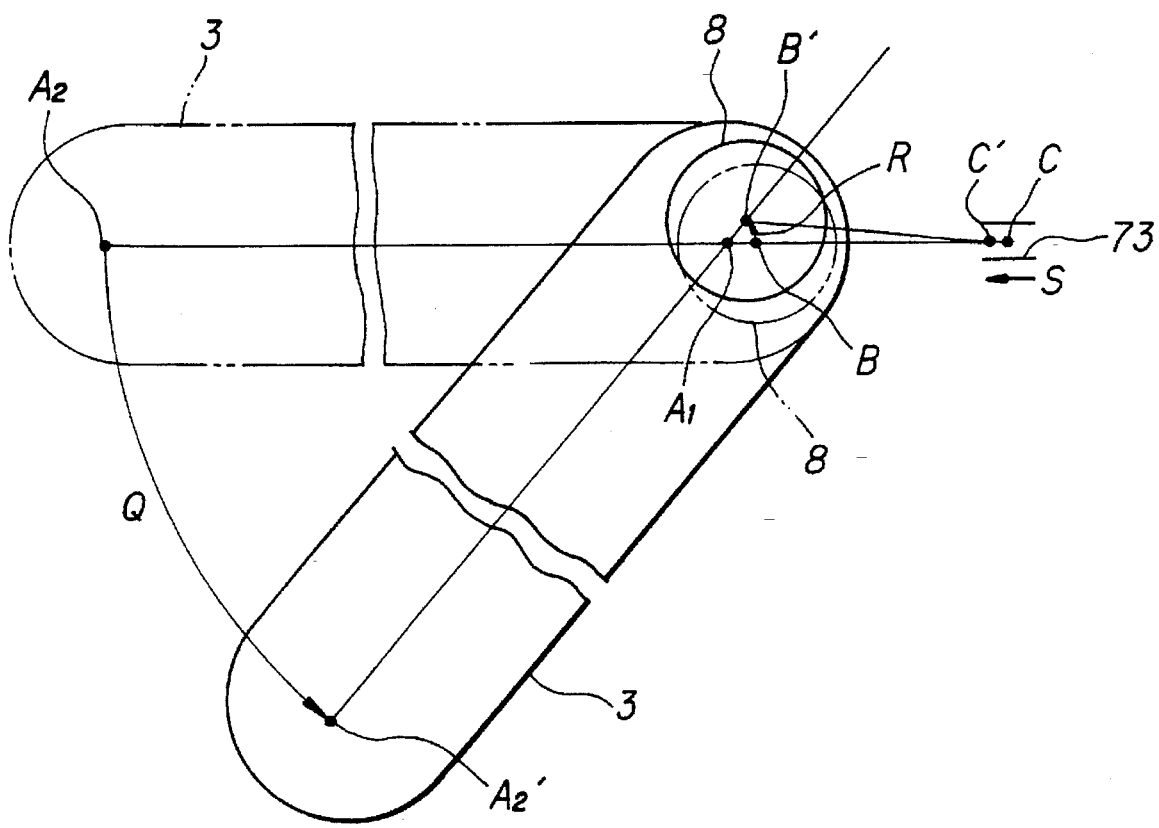
FIG. 16(b) is a horizontal outline view for explaining tension adjustment within the articulated robot and the positional relationship between rotation of the first arm and support of the housing thereafter, showing the state after rotation of the first arm.
Figure 17:
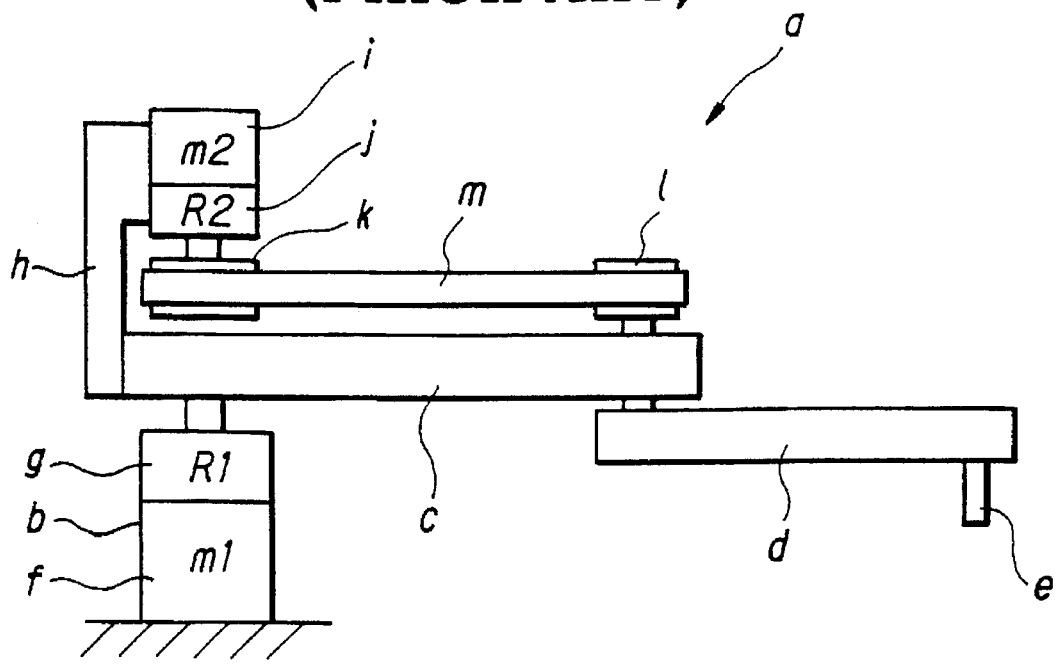
FIG. 17 is an outline view for explaining the structure of a conventional articulated robot.
Figure 18:
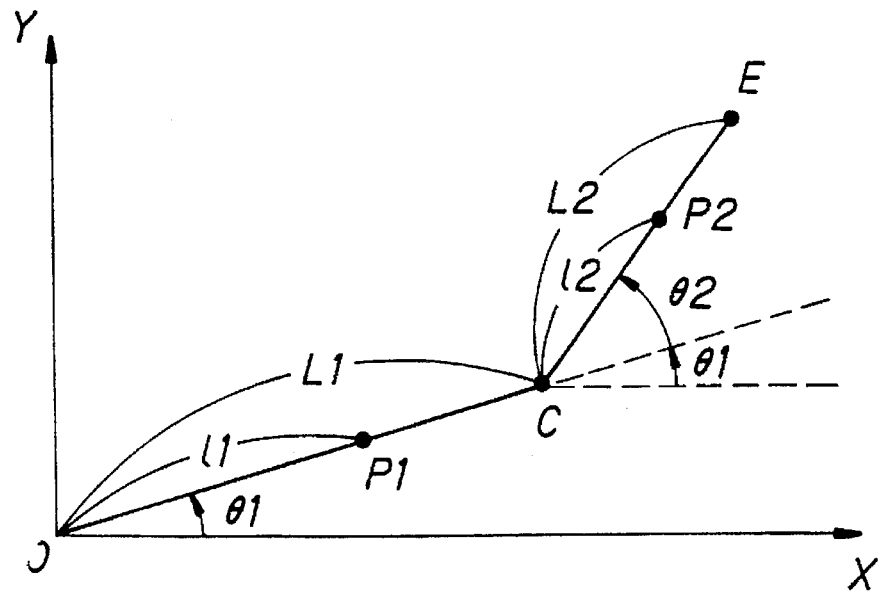
FIG. 18 is a diagram graphically showing the robot of FIG. 8 in the horizontal plane.

FIGS. 16(a) and 16(b) are explanatory drawings of this, and shows in outline the robot 101 seen horizontally.

In the drawing, "A1" indicates the rotation shaft 106 of the first arm 103 and "A2" indicates the rotation shaft 117 of the second arm 107. Also, "B" indicates the drive shaft of the motor 108 and the output shaft 109b of the harmonic reduction gear 109, and does not conform to the rotation shaft A1. In addition, the two parallel lines positioned to the right of the first arm 103 indicate the guide groove 173 and "C" positioned in the guide groove 173 is the central axis of the shaft 160.

As shown in FIG. 16(a), where the shaft B is displaced on the elongated line of the line A1-A2 with respect to the rotation shaft A1 due to tension adjustment of the steel belt 119, as shown in FIG. 16(b), when the first arm 103 is rotated from the state shown by the double dotted to the state shown by the solid line, the rotation shaft A2 moves to the rotation shaft A2' and the shaft B moves to the shalt B'. As is clear from either of these shafts revolving around the rotation shaft A1 as shown by the arrows Q and R, the angle formed between the line A1-A2 and the line A1-A2' is equal to the angle formed between the line A1-B and the line A1-B'. Thereby, since the gap between the rotation shaft A2 and the shaft B is equal to the gap between the rotation shaft A2' and the shaft B', there is no change in the tension of the steel belt 119 accompanying rotation of the first arm 103.

However, since the gap between the shaft B and the shaft C is continuously constant, where shaft position B moves to shaft B', shaft C moves in the forward direction along the guide groove 173 as shown by the arrow S to become shaft C'. In other words, the length of the line B-C and the length of the line B'-C' are equal, and the shaft C' is in a state where it moves forward along the line B-C. During the movement from shaft C to shaft C', the rollers 161 and 162 move while respectively contacting the inner walls of the guide plates 171 and 170 within the guide groove 173 and due to this the shaft 160 moves smoothly in the forward direction.

As explained above, even in cases where the drive shaft B of the second arm 107 is displaced with respect to the rotation shaft 106 of the first arm 103, due to tension adjustment of the steel belt 119, it is assured that the tension of the steel belt does not change together with the rotation of the first arm 103 since the motor unit is supported by the bearing holder 111, and in addition the end portion of the support arm 115 of the housing 110 is rotatable with respect to the support member 114 and is supported in a slidable state along the length direction of the first arm 103, therefore changes in the gap between the housing 110 and the support member 114 accompanying rotation of the first arm 103 can be responded to. In other words, in the position relationship of the drive shaft B of the second arm 7 and the rotation shaft 6 of the first arm 3, the shaft B rotates around the rotation shaft A1 in the same way as in the case where the motor unit is fixed to the first arm 3, and in addition the load of the motor unit can be distributed between the support arm 15 and the support member 14.

As is clear from the above description, according to the articulated robot shown in FIG. 9, by supporting the drive means of the second rotating body (corresponding to the second arm in the above example) in a rotatable state with respect to the first rotating body (corresponding to the first arm in the above example), even in cases where displacement occurs between the drive shaft of the drive means of the second rotating body and the rotation shaft of the first rotating body after tension adjustment of a power transmission belt, the gap between the rotation shaft of the second rotating body and the drive shaft of the drive means thereof is maintained at a constant when the first rotating body rotates.

Also, by supporting the support arm of the second rotating body in the support member in a rotatable state and slidable state along the length direction of the first rotating body without fixing the support arm of the drive means of the second rotating body to the support member, the support mechanism of the drive means of the second rotating body does not hinder rotation of the first rotating body.

Thereby tension adjustment of the power transmission belt can be performed without using a tension pulley, and since it is not necessary to perform positioning of both shafts so that the drive of the second arm accurately conforms to the drive shaft of the second arm, adjustment operations can be simply performed without complication of the structure for tension adjustment.

As is clear from the above description, according to the articulated robot of the present invention, as well as fixing a drive means for rotating a second rotating body to a base or base shaft portion, by forming a robot system such that the drive shaft of the drive means of the second rotating body and the drive shaft of the drive means of a first rotating body are disposed substantially coaxial end the driving power of the second rotating body is transferred to a rotation shaft of the second rotating body by a driving power transmission means, as well as the inertia term of the first rotating body not affecting the orientation of the second rotating body, the Coriolis force of the first rotating body is eliminated and interference terms (inertia force and centrifugal force) generated in each rotating body arising from the relative motions therebetween due to the center of gravity of the second rotating body being positioned on the rotation shaft thereof are eliminated, and it is possible to stop each of the rotating bodies from imposing interference operations.

Thereby, it is possible to adjust the gain for feedback control with respect to each of the rotating bodies to an optimum value and as a result to greatly shorten the time required for the static determination of the robot and the tact time.

What is claimed is:

1. An articulated robot comprising:

a base shaft portion rigid with a base;

a first elongate body having first and second ends, the first elongate body being pivotally supported at its first end on the base shaft portion so as to be rotatable with respect to the base about a first rotational center and in a first plane which is essentially normal to the base shaft portion;

a second elongate body having first and second ends, the second elongate body being pivotally connected at its first end to the second end of the first elongate body so as to be rotatable with respect to the first elongate body about a second rotational center and about a second plane which is essentially parallel to the first plane;

first drive means;

support means, fixed to one of the base or the base shaft portion for supporting the first drive means above the first elongate body and isolating a mass of the first drive means from the first elongate body and therefore preventing the mass of the first drive means from increasing an inertia of the first elongate body;

driving power transmission means for transmitting driving power from the first drive means to a rotation shaft operatively connected with the second elongate body for selectively rotating the second elongate body with respect to the first elongate body; and adjustment means for moving the drive shaft of the first driving means relative to the rotation shaft of the second elongate body, the support means including a support arm for supporting the first drive means, the support arm being rotatably supported on a support member provided on one of the base and the base shaft portion and slidable toward the base shaft portion.

2. The articulated robot according to claim 1, wherein a center of gravity of the second elongate body is positioned substantially on an axis of the rotation shaft of the second elongate body.

3. The articulated robot according to claim 2, wherein the second elongate body includes a balancer for adjusting a position of the center of gravity of the second elongate body.

4. The articulated robot according to claim 2, wherein the second elongate body includes an operating device and second drive means for driving the operating device, the position of the center of gravity of the second elongate body being adjusted by the second drive means.

5. The articulated robot according to claim 1, which the driving power transmission means includes a power transmission belt for transmitting driving power of the first drive means.

6. The articulated robot according to claim 5, wherein the support arm includes roller members, the roller members being movable along a guide groove provided in the support member.

7. The articulated robot according to claim 5, wherein the adjustment means includes an adjusting screw, the gap between the rotation shaft of the second elongate body and the drive shaft of the first driving means being changed by the adjusting screw.

8. An articulated robot comprising:

a base;

a support shaft rigid with the base;

a first arm having first and second ends, the first arm being pivotally supported at its first end on the support shaft;

a second arm having first and second ends, the second arm being pivotally connected at its first end to the second end of the first arm so as to be rotatable with respect to the first arm;

a motor, the motor having a drive shaft;

motor support means rigid with the base for supporting the motor in a predetermined spatial relationship with the first arm and for isolating a mass of the motor from the first arm to prevent the mass of the motor from increasing an inertia of the first arm;

belt drive means for transmitting driving power by way of a belt from the motor to the second arm for selectively rotating the second arm with respect to the first arm; and adjustment means operatively incorporated in the motor support means and the drive shaft of the motor for adjusting a tension in the belt of the belt drive means in a manner which moves the drive shaft of the motor eccentrically with respect to the support shaft about which the first arm is pivotal, and which enables the belt tension to be maintained constant irrespective of the first arm pivoting from one position to another.

9. An articulated robot according to claim 8, wherein the adjustment means comprises a support arm which is pivotally connected to a block slidably supported on a structure which is rigid with the base.

* * * * *